United States Patent
Hamada et al.

(10) Patent No.: US 12,074,339 B2
(45) Date of Patent: Aug. 27, 2024

(54) SEPARATOR INCLUDING POROUS SUBSTRATE, HEAT RESISTANT POROUS LAYER, AND ADHESIVE LAYER, AND NON-AQUEOUS SECONDARY BATTERY INCLUDING THE SAME

(71) Applicant: TEIJIN LIMITED, Osaka (JP)

(72) Inventors: Tomoya Hamada, Osaka (JP); Susumu Honda, Osaka (JP)

(73) Assignee: TEIJIN LIMITED, Osaka (JP)

( * ) Notice: Subject to any disclaimer, the term of this patent is extended or adjusted under 35 U.S.C. 154(b) by 250 days.

(21) Appl. No.: 16/958,533

(22) PCT Filed: Nov. 30, 2018

(86) PCT No.: PCT/JP2018/044319
§ 371 (c)(1),
(2) Date: Jun. 26, 2020

(87) PCT Pub. No.: WO2019/130994
PCT Pub. Date: Jul. 4, 2019

(65) Prior Publication Data
US 2021/0057703 A1  Feb. 25, 2021

(30) Foreign Application Priority Data

Dec. 27, 2017 (JP) ................ 2017-252241
Dec. 27, 2017 (JP) ................ 2017-252242
(Continued)

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/417* (2021.01);
(Continued)

(58) Field of Classification Search
CPC . H01M 50/449; H01M 50/446; H01M 50/411
(Continued)

(56) References Cited

U.S. PATENT DOCUMENTS

2011/0143185 A1   6/2011  Nishikawa
2011/0269010 A1*  11/2011  Sawaguchi ........... C23C 16/408
                                              977/773
(Continued)

FOREIGN PATENT DOCUMENTS

CN    202333016 U    7/2012
JP    2001-6744 A    1/2001
(Continued)

OTHER PUBLICATIONS

International Search Report for PCT/JP2018/044319 dated Jan. 8, 2019 (PCT/ISA/210).

*Primary Examiner* — Sean P Cullen
(74) *Attorney, Agent, or Firm* — Sughrue Mion, PLLC

(57) ABSTRACT

Provided is a separator for a non-aqueous secondary battery, containing a porous substrate; a heat resistant porous layer that is provided on one side or on both sides of the porous substrate, and that contains a porous coating film including at least one selected from the group consisting of a wholly aromatic polyamide, a polyamide imide and a polyimide; and an adhesive layer that is provided on one side or on both sides of a layered body containing the porous substrate and the heat resistant porous layer, in which adhesive resin particles adhere to the layered body, and provided is a separator for a non-aqueous secondary battery, containing a porous substrate; a heat resistant porous layer that is pro- (Continued)

vided on one side or on both sides of the porous substrate, and that contains at least one of inorganic particles or a heat resistant resin, the heat resistant resin having at least one of an amide bond or an imide bond in a molecule; and an adhesive layer that is provided on one side or on both sides of a layered body containing the porous substrate and the heat resistant porous layer, wherein adhesive resin particles adhere to the layered body, in which a peel strength between the porous substrate and the heat resistant porous layer is from 5 N/m to 75 N/m.

19 Claims, 14 Drawing Sheets

(30) Foreign Application Priority Data

Dec. 27, 2017 (JP) ................................. 2017-252243
Dec. 27, 2017 (JP) ................................. 2017-252244

(51) Int. Cl.
*H01M 50/417* (2021.01)
*H01M 50/42* (2021.01)
*H01M 50/426* (2021.01)
*H01M 50/443* (2021.01)
*H01M 50/451* (2021.01)
*H01M 50/457* (2021.01)
*H01M 50/489* (2021.01)
*H01M 50/491* (2021.01)
*H01M 50/494* (2021.01)

(52) U.S. Cl.
CPC ......... *H01M 50/42* (2021.01); *H01M 50/426* (2021.01); *H01M 50/443* (2021.01); *H01M 50/451* (2021.01); *H01M 50/457* (2021.01); *H01M 50/494* (2021.01); *H01M 50/489* (2021.01); *H01M 50/491* (2021.01)

(58) Field of Classification Search
USPC ................. 429/144, 251, 253, 254
See application file for complete search history.

(56) References Cited

U.S. PATENT DOCUMENTS

| | | | |
|---|---|---|---|
| 2013/0101889 A1 | 4/2013 | Mizuno et al. | |
| 2013/0244082 A1* | 9/2013 | Lee ..................... | H01M 50/451 |
| | | | 429/144 |
| 2014/0242470 A1 | 8/2014 | Ogata | |
| 2015/0263325 A1 | 9/2015 | Honda et al. | |
| 2015/0333308 A1* | 11/2015 | Toyoda ............... | H01M 50/403 |
| | | | 429/144 |
| 2016/0285064 A1* | 9/2016 | Hatta ................... | H02J 7/0068 |
| 2017/0338459 A1 | 11/2017 | Nakahiro et al. | |
| 2018/0166672 A1* | 6/2018 | Honda ................ | H01M 50/414 |
| 2018/0315971 A1* | 11/2018 | Kwon ................. | H01M 50/417 |

FOREIGN PATENT DOCUMENTS

| | | | | |
|---|---|---|---|---|
| JP | 2010-92718 A | | 4/2010 | |
| JP | 2010-146839 A | | 7/2010 | |
| JP | 2011-23162 A | | 2/2011 | |
| JP | 2011-192529 A | | 9/2011 | |
| JP | 2011-204587 A | | 10/2011 | |
| JP | 2012-99324 A | | 5/2012 | |
| JP | 2012099324 A | * | 5/2012 | |
| JP | 2013-20769 A | | 1/2013 | |
| JP | 2013-196839 A | | 9/2013 | |
| JP | 2013-219005 A | | 10/2013 | |
| JP | 2015026459 A | * | 2/2015 | |
| JP | 5946257 B2 | | 7/2016 | |
| JP | 2016-139490 A | | 8/2016 | |
| JP | 5971662 B2 | | 8/2016 | |
| JP | 5976015 B2 | | 8/2016 | |
| JP | 2016-207616 A | | 12/2016 | |
| JP | 6112115 B2 | | 4/2017 | |
| JP | 2017-132925 A | | 8/2017 | |
| KR | 2017019522 A | * | 2/2017 | .......... H01M 10/052 |
| KR | 10-2017-0045438 A | | 4/2017 | |
| WO | 2012/057037 A1 | | 5/2012 | |
| WO | 2013/151144 A1 | | 10/2013 | |
| WO | WO-2014083988 A1 | * | 6/2014 | ........ H01M 10/0525 |
| WO | 2016/047165 A1 | | 3/2016 | |
| WO | WO-2017047576 A1 | * | 3/2017 | ............ H01G 11/52 |
| WO | WO-2017082671 A1 | * | 5/2017 | .......... H01M 10/052 |
| WO | 2017/107436 A1 | | 6/2017 | |

* cited by examiner

SEPARATOR INCLUDING POROUS SUBSTRATE, HEAT RESISTANT POROUS LAYER, AND ADHESIVE LAYER, AND NON-AQUEOUS SECONDARY BATTERY INCLUDING THE SAME

CROSS REFERENCE TO RELATED APPLICATIONS

This application is a National Stage of International Application No. PCT/JP2018/044319 filed Nov. 30, 2018, claiming priority based on Japanese Patent Application No. 2017-252241 filed on Dec. 27, 2017, Japanese Patent Application No. 2017-252242 filed on Dec. 27, 2017, Japanese Patent Application No. 2017-252243 filed on Dec. 27, 2017, and Japanese Patent Application No. 2017-252244 filed on Dec. 27, 2017.

TECHNICAL FIELD

The present invention relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Recently, for a non-aqueous secondary battery represented by a lithium ion secondary battery, an application thereof as a battery for electric power storage or electric vehicles is being reviewed due to the property of a high energy density thereof.

With spread of non-aqueous secondary batteries, it has been increasingly required to ensure safety and stable battery characteristics. Specific measures for ensuring safety and stable battery characteristics include increasing heat resistance of a separator and increasing adhesiveness between an electrode and the separator.

As a separator having improved heat resistance, a separator including a heat resistant porous layer containing at least one of inorganic particles or a heat resistant resin is known. As a separator having improved adhesiveness to an electrode, a separator including an adhesive layer containing a resin having adhesiveness to the electrode is known. For example, separators disclosed in Patent Documents 1 to 6 include both a heat resistant porous layer and an adhesive layer.

PRIOR ART DOCUMENTS

Patent Documents

Patent Document 1: Japanese Patent No. 5971662
Patent Document 2: Japanese Patent No. 5976015
Patent Document 3: Japanese Patent No. 5946257
Patent Document 4: Japanese Patent No. 6112115
Patent Document 5: International Publication No. WO 2013/151144
Patent Document 6: Japanese Patent Application Laid-Open (JP-A) No. 2013-20769

SUMMARY OF INVENTION

Technical Problem

As the content of inorganic particles in a heat resistant porous layer is larger, heat resistance of a separator is higher. However, as the content of the inorganic particles is larger, the heat resistant porous layer is more easily peeled from a porous substrate or an adhesive layer, and the heat resistant porous layer is more brittle. In this case, even if the separator maintains adhesion between the adhesive layer and an electrode, interfacial destruction between the heat resistant porous layer and the porous substrate, interfacial destruction between the heat resistant porous layer and the adhesive layer, or cohesive failure of the heat resistant porous layer occurs, and as a result, adhesion between the separator and the electrode cannot be maintained. From a viewpoint of suppressing such a phenomenon, the heat resistant porous layer requires not only heat resistance but also resistance to peeling from the porous substrate, resistance to peeling from the adhesive layer, and toughness. Similarly, the adhesive layer requires not only adhesiveness to an electrode but also resistance to peeling from the heat resistant porous layer or the porous substrate with which the adhesive layer is in contact, and toughness.

An embodiment of the present disclosure was achieved under the above described circumstances.

An object of an embodiment of the present disclosure is to provide a separator including a heat resistant porous layer and an adhesive layer, which is a separator for a non-aqueous secondary battery having excellent adhesiveness to an electrode, and to solve the problem.

Solution to Problem

The specific solutions to the problem include the following embodiments:

[1] A separator for a non-aqueous secondary battery, the separator containing:
a porous substrate;
a heat resistant porous layer that is provided on one side or on both sides of the porous substrate, and that contains a porous coating film including at least one selected from the group consisting of a wholly aromatic polyamide, a polyamide imide and a polyimide; and
an adhesive layer that is provided on one side or on both sides of a layered body comprising the porous substrate and the heat resistant porous layer, wherein adhesive resin particles adhere to the layered body.

[2] The separator for a non-aqueous secondary battery according to [1], wherein a peel strength between the porous substrate and the heat resistant porous layer is from 5 N/m to 75 N/m.

[3] The separator for a non-aqueous secondary battery according to [1] or [2], wherein the heat resistant porous layer further contains inorganic particles and a content ratio of the inorganic particles in the heat resistant porous layer is from 50% by mass to 90% by mass.

[4] A separator for a non-aqueous secondary battery, the separator containing:
a porous substrate;
a heat resistant porous layer that is provided on one side or on both sides of the porous substrate, and that contains at least one of inorganic particles or a heat resistant resin, the heat resistant resin having at least one of an amide bond or an imide bond in a molecule; and
an adhesive layer that is provided on one side or on both sides of a layered body comprising the porous substrate and the heat resistant porous layer, wherein adhesive resin particles adhere to the layered body,
wherein a peel strength between the porous substrate and the heat resistant porous layer is from 5 N/m to 75 N/m.

[5] The separator for a non-aqueous secondary battery according to anyone of [1] to [4], wherein the adhesive resin particles comprise a mixture that includes a first adhesive resin particle containing a polyvinylidene fluoride type resin and a second adhesive resin particle containing an acrylic type resin.

[6] The separator for a non-aqueous secondary battery according to anyone of [1] to [5], wherein a Gurley value difference between the separator for a non-aqueous secondary battery and the porous substrate is from 20 sec/100 ml to 300 sec/100 ml.

[7] The separator for a non-aqueous secondary battery according to anyone of [1] to [6], wherein at least one of a tensile strength of an MD direction, or a tensile strength of a TD direction, of the separator for a non-aqueous secondary battery is from 500 kgf/cm$^2$ to 3,000 kgf/cm$^2$.

[8] The separator for a non-aqueous secondary battery according to anyone of [1] to [7], wherein a weight of the adhesive layer is from 0.2 g/m$^2$ to 2.0 g/m$^2$ per one side of the layered body.

[9] The separator for a non-aqueous secondary battery according to anyone of [1] to [8], wherein the porous substrate is a microporous membrane containing a polypropylene.

[10] A non-aqueous secondary battery that obtains electromotive force by lithium doping and dedoping, the non-aqueous secondary battery containing:
a positive electrode;
a negative electrode; and
the separator for a non-aqueous secondary battery according to any one of [1] to [9], the separator being disposed between the positive electrode and the negative electrode.

Advantageous Effects of Invention

According to the present disclosure, a separator including a heat resistant porous layer and an adhesive layer, which is a separator for a non-aqueous secondary battery having excellent adhesiveness to an electrode is provided.

DESCRIPTION OF EMBODIMENTS

Figure 1A:
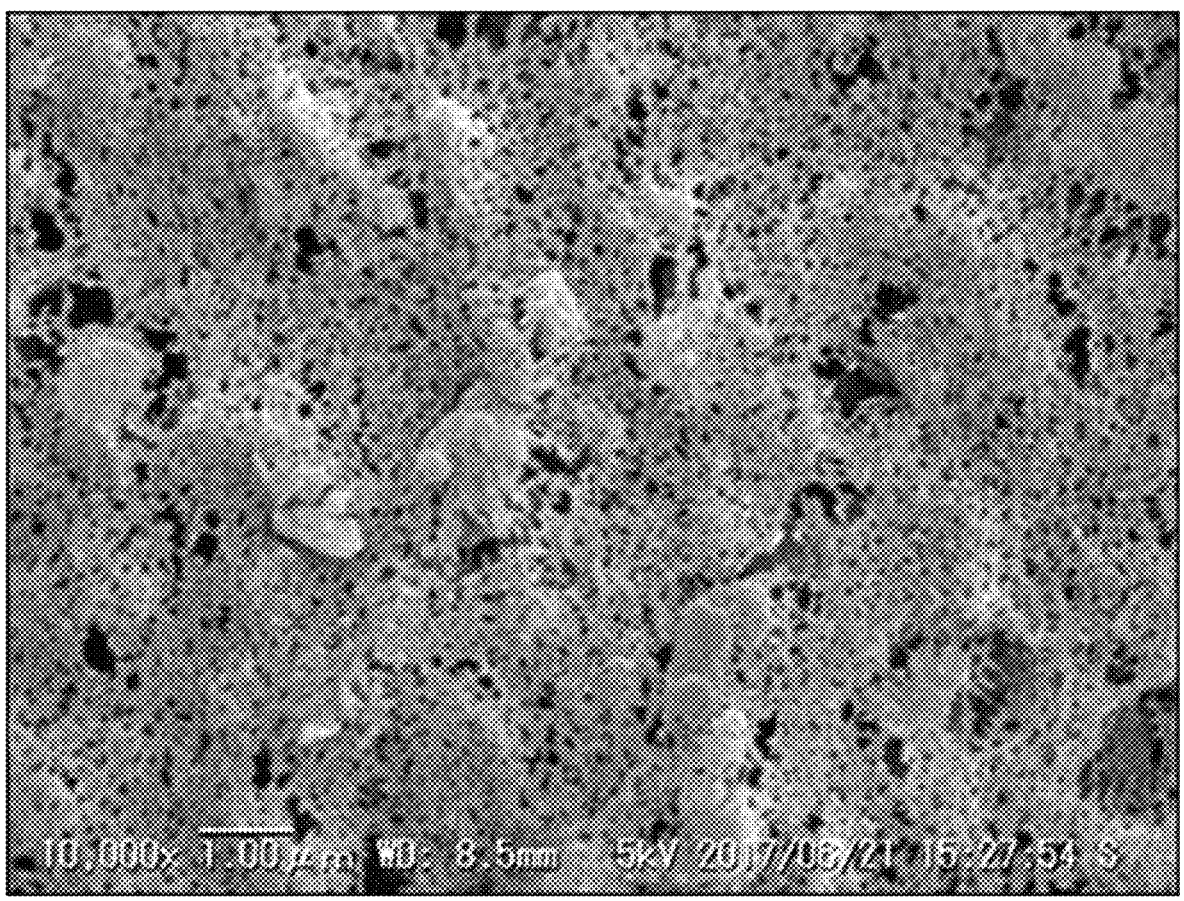
FIG. 1A is an electron microscopic image of an outer surface of an embodiment example of a heat resistant porous layer included in a first separator for a non-aqueous secondary battery. In this embodiment example, a porous coating film of the heat resistant porous layer contains a wholly aromatic polyamide.

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values.

In the present disclosure, the term "process" includes not only an independent process, but also the process which is not clearly distinguished from other processes but achieves the desired purpose thereof.

In the present application, in a case where plural kinds of substances that correspond to the same component exist in a composition, the amount of the component in the composition refers to the total amount of the plural kinds of substances existing in the composition unless otherwise specified.

For the separator of the present disclosure, "MD direction" refers to the longitudinal direction of a porous substrate and a separator manufactured in a long shape, and "TD direction" refers to a direction orthogonal to "the longitudinal direction". "MD direction" also refers to "a machine direction", and "TD direction" also refers to "a width direction".

In the present disclosure, in a case where a lamination relationship among layers constituting a separator is expressed as "upper" and "lower", a layer closer to a substrate is referred to as "lower", and a layer farther from the substrate is referred to as "upper".

In a case where an embodiment is described with reference to the drawings in the present disclosure, the configuration of the embodiment is not limited to the configuration illustrated in the drawings. In addition, the sizes of members in each of the drawings are conceptual, and a relative relationship between the sizes of the members is not limited thereto.

In the present disclosure, the notation of "(meth)acrylic" means "acrylic" or "methacrylic".

In the present disclosure, a heat resistant resin refers to a resin having a melting point of 180° C. or higher, or a resin having no melting point and a decomposition temperature of 180° C. or higher. That is, the heat resistant resin in the present disclosure is a resin that is not melted or decomposed in a temperature range of lower than 180° C.

The present disclosure discloses a first separator for a non-aqueous secondary battery and a second separator for a non-aqueous secondary battery. The first separator for a non-aqueous secondary battery does not necessarily correspond to the second separator for a non-aqueous secondary battery, but may correspond to the second separator for a non-aqueous secondary battery. The second separator for a non-aqueous secondary battery does not necessarily correspond to the first separator for a non-aqueous secondary battery, but may correspond to the first separator for a non-aqueous secondary battery.

In the present disclosure, matters common to the first separator for a non-aqueous secondary battery and the second separator for a non-aqueous secondary battery will be described as "separator of the present disclosure".

<First Separator for Non-Aqueous Secondary Battery>

The first separator for a non-aqueous secondary battery (also referred to as "first separator") includes a porous substrate, a heat resistant porous layer that is provided on one side or on both sides of the porous substrate, and an adhesive layer that is provided on one side or on both sides of a layered body containing the porous substrate and the heat resistant porous layer.

The heat resistant porous layer in the first separator has a porous coating film containing at least one selected from the group consisting of a wholly aromatic polyamide, a polyamide imide, and a polyimide. The porous coating film may contain a component other than a wholly aromatic polyamide, a polyamide imide, and a polyimide. Examples of the form of the heat resistant porous layer include the following forms (a) to (d).

Form (a): The heat resistant porous layer is a porous coating film itself containing at least one selected from the group consisting of a wholly aromatic polyamide, a polyamide imide, and a polyimide.

Form (b): The heat resistant porous layer includes an inner layer formed on the porous substrate and containing at least one selected from the group consisting of a wholly aromatic polyamide, a polyamide imide, and a polyimide, and a porous coating film formed so as to cover an outer surface of the inner layer and containing at least one selected from the group consisting of a wholly aromatic polyamide, a polyamide imide, and a polyimide. The inner layer has a porous structure having a larger pore diameter than the porous coating film. The heat resistant porous layer has a so-called skin-core structure as a whole.

Form (c): The heat resistant porous layer further contains inorganic particles, and the inorganic particles are bonded to each other and covered by a porous coating film containing at least one selected from the group consisting of a wholly aromatic polyamide, a polyamide imide, and a polyimide.

Form (d): The heat resistant porous layer includes an inner layer formed on the porous substrate and containing at least one selected from the group consisting of a wholly aromatic polyamide, a polyamide imide, and a polyimide, as well as inorganic particles, and a porous coating film formed so as to cover an outer surface of the inner layer and containing at least one selected from the group consisting of a wholly aromatic polyamide, a polyamide imide, and a polyimide. In the inner layer, the inorganic particles are bonded to each other by at least one selected from the group consisting of a wholly aromatic polyamide, a polyamide imide, and a polyimide, and the inner layer has a porous structure having a larger pore diameter than the porous coating film. The heat resistant porous layer has a so-called skin-core structure as a whole.

FIGS. 1A, 1B, 2A, 2B, 3A, and 3B illustrate scanning electron microscopic images (SEM images) of embodiment examples of the heat resistant porous layer included in the first separator. The heat resistant porous layers illustrated in FIGS. 1A, 1B, 2A, 2B, 3A, and 3B also contain inorganic particles.

Figure 1B:
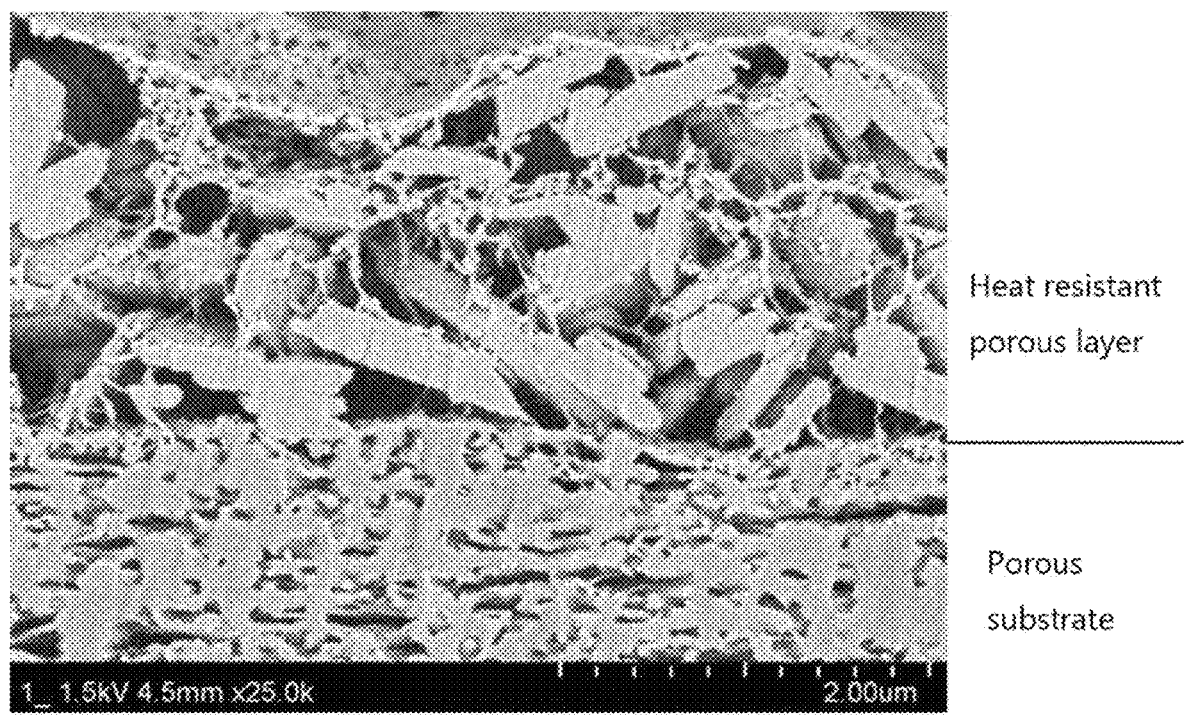
FIG. 1B is an electron microscopic image of a cross section of an embodiment example of a heat resistant porous layer and a porous substrate included in the first separator for a non-aqueous secondary battery. In this embodiment example, a porous coating film of the heat resistant porous layer contains a wholly aromatic polyamide.

In the heat resistant porous layer illustrated in FIGS. 1A and 1B, the porous coating film contains a wholly aromatic polyamide. FIG. 1A is an SEM image of an outer surface (a surface farther from the porous substrate) of the heat resistant porous layer, and FIG. 1B is an SEM image of cross sections of the heat resistant porous layer and the porous substrate. The porous coating film is a coating film forming an outer surface of the heat resistant porous layer, and is a dense coating film having micropores.

Figure 2A:
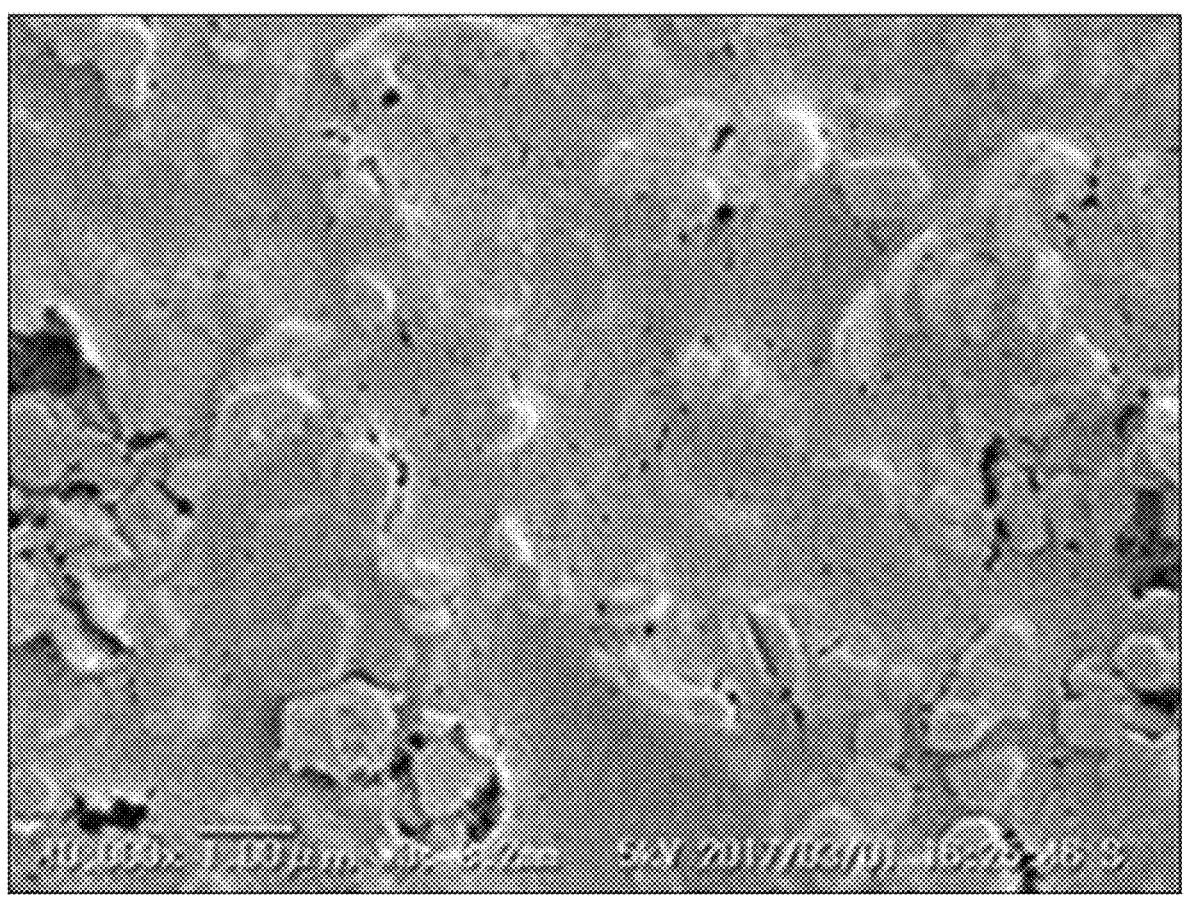
FIG. 2A is an electron microscopic image of an outer surface of an embodiment example of the heat resistant porous layer included in the first separator for a non-aqueous secondary battery. In this embodiment example, a porous coating film of the heat resistant porous layer contains a polyamideimide.
Figure 2B:
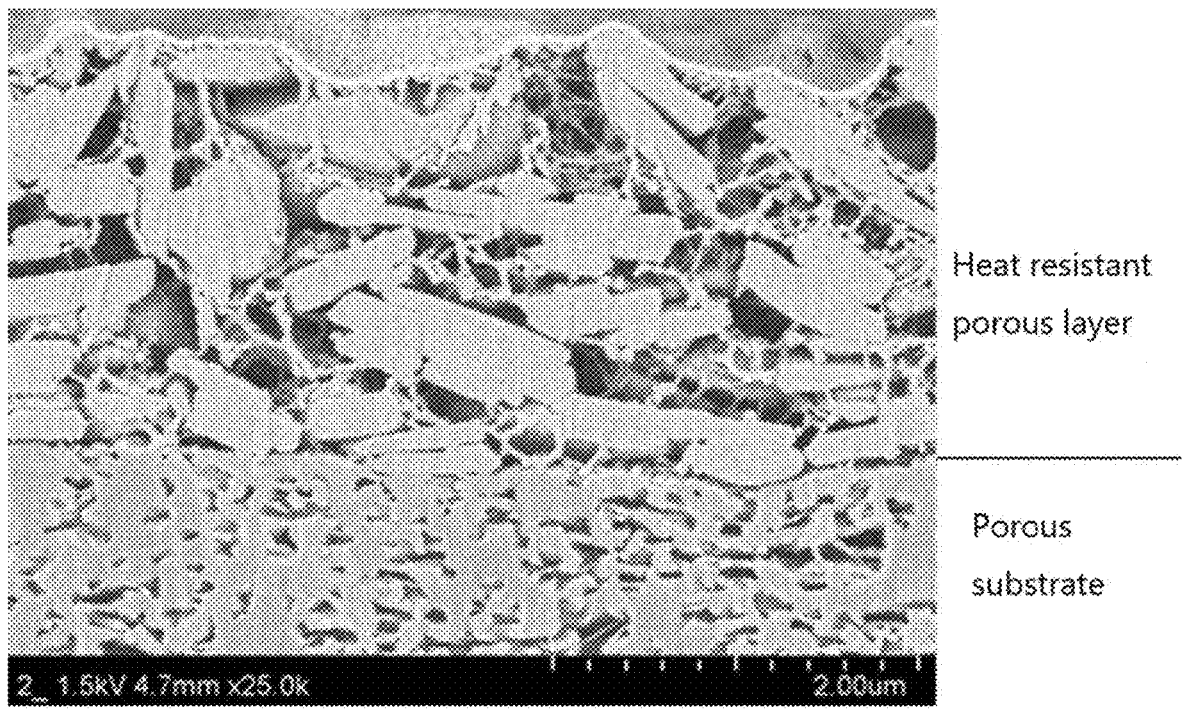
FIG. 2B is an electron microscopic image of a cross section of an embodiment example of the heat resistant porous layer and the porous substrate included in the first separator for a non-aqueous secondary battery. In this embodiment example, a porous coating film of the heat resistant porous layer contains a polyamideimide.

In the heat resistant porous layer illustrated in FIGS. 2A and 2B, the porous coating film contains a polyamide imide. FIG. 2A is an SEM image of an outer surface (a surface farther from the porous substrate) of the heat resistant porous layer, and FIG. 2B is an SEM image of cross sections of the heat resistant porous layer and the porous substrate. The porous coating film is a coating film forming an outer surface of the heat resistant porous layer, and is a dense coating film having micropores.

Figure 3A:
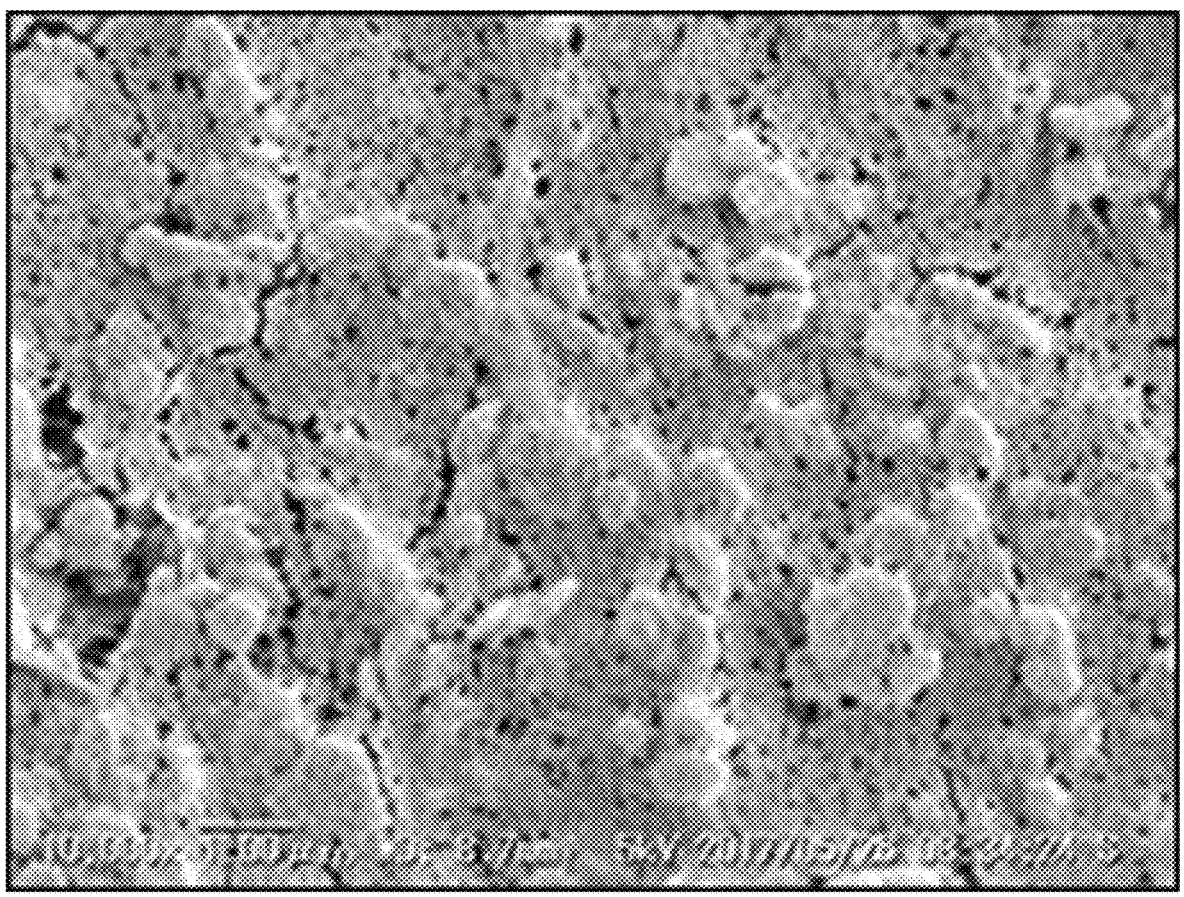
FIG. 3A is an electron microscopic image of an outer surface of an embodiment example of the heat resistant porous layer included in the first separator for a non-aqueous secondary battery. In this embodiment example, a porous coating film of the heat resistant porous layer contains a polyimide.
Figure 3B:
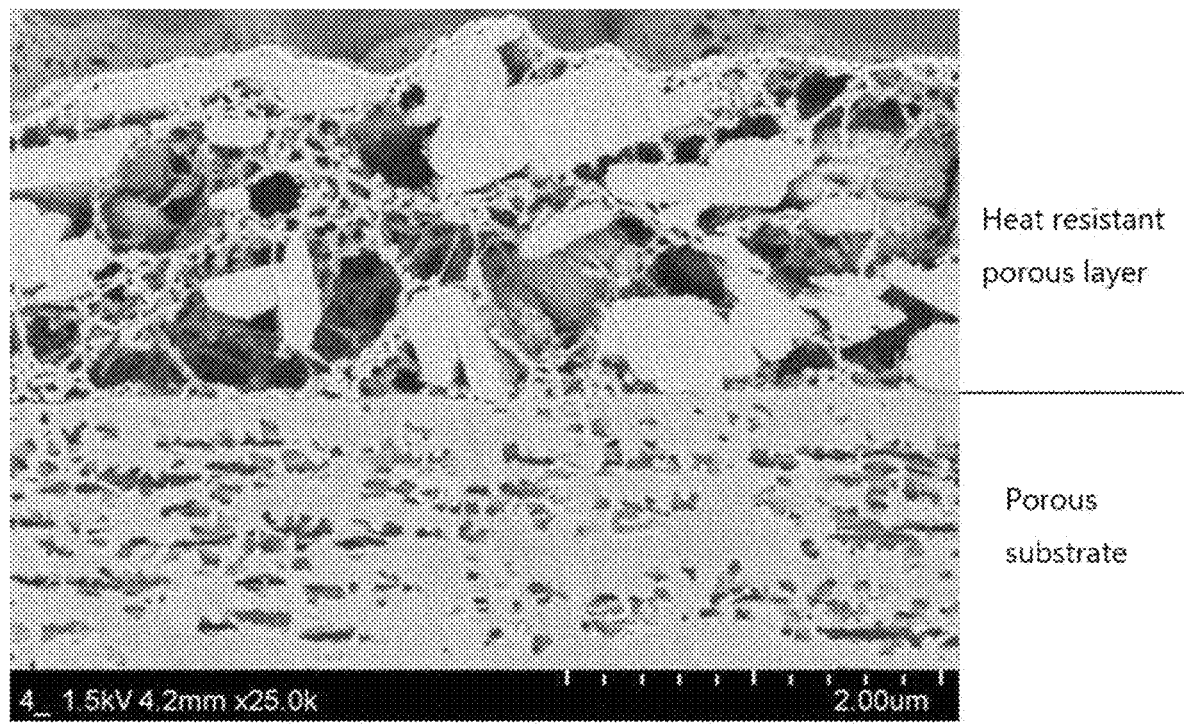
FIG. 3B is an electron microscopic image of a cross section of an embodiment example of the heat resistant porous layer and the porous substrate included in the first separator for a non-aqueous secondary battery. In this embodiment example, a porous coating film of the heat resistant porous layer contains a polyimide.

In the heat resistant porous layer illustrated in FIGS. 3A and 3B, the porous coating film contains a polyimide. FIG. 3A is an SEM image of an outer surface (a surface farther from the porous substrate) of the heat resistant porous layer, and FIG. 3B is an SEM image of cross sections of the heat resistant porous layer and the porous substrate. The porous coating film is a coating film forming an outer surface of the heat resistant porous layer, and is a dense coating film having micropores.

Figure 1C:
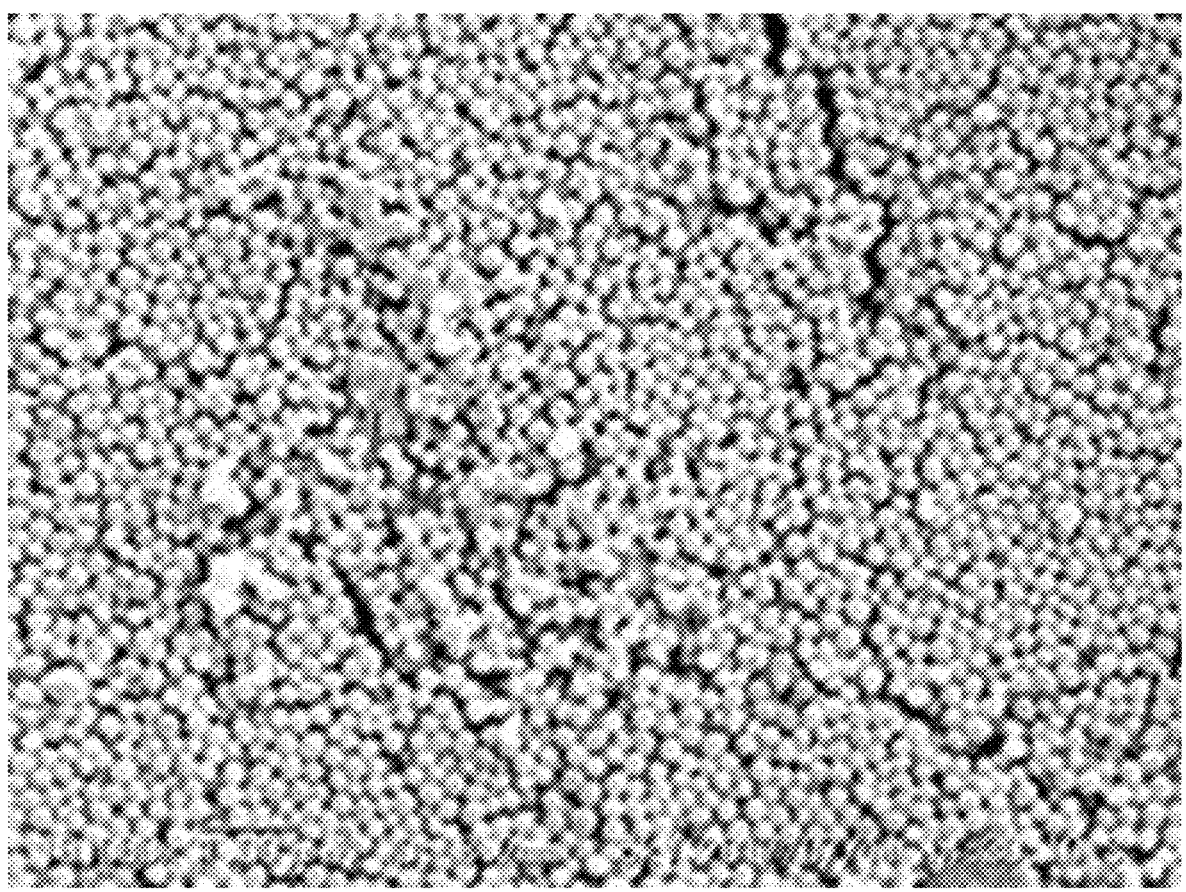
FIG. 1C is an electron microscopic image of a surface of an embodiment example of an adhesive layer included in the first separator for a non-aqueous secondary battery. In this embodiment example, a porous coating film of the heat resistant porous layer contains a wholly aromatic polyamide.
Figure 2C:
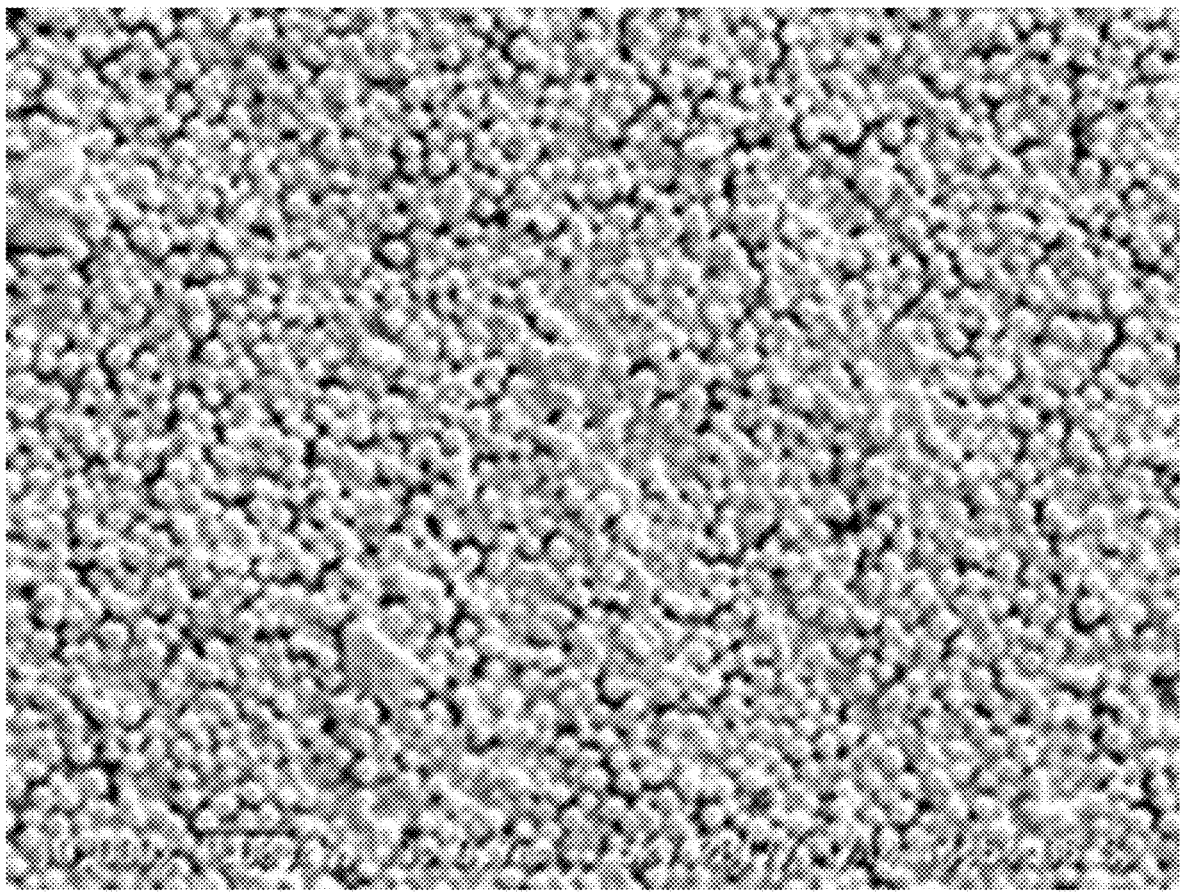
FIG. 2C is an electron microscopic image of a surface of an embodiment example of the adhesive layer included in the first separator for a non-aqueous secondary battery. In this embodiment example, a porous coating film of the heat resistant porous layer contains a polyamideimide.
Figure 3C:
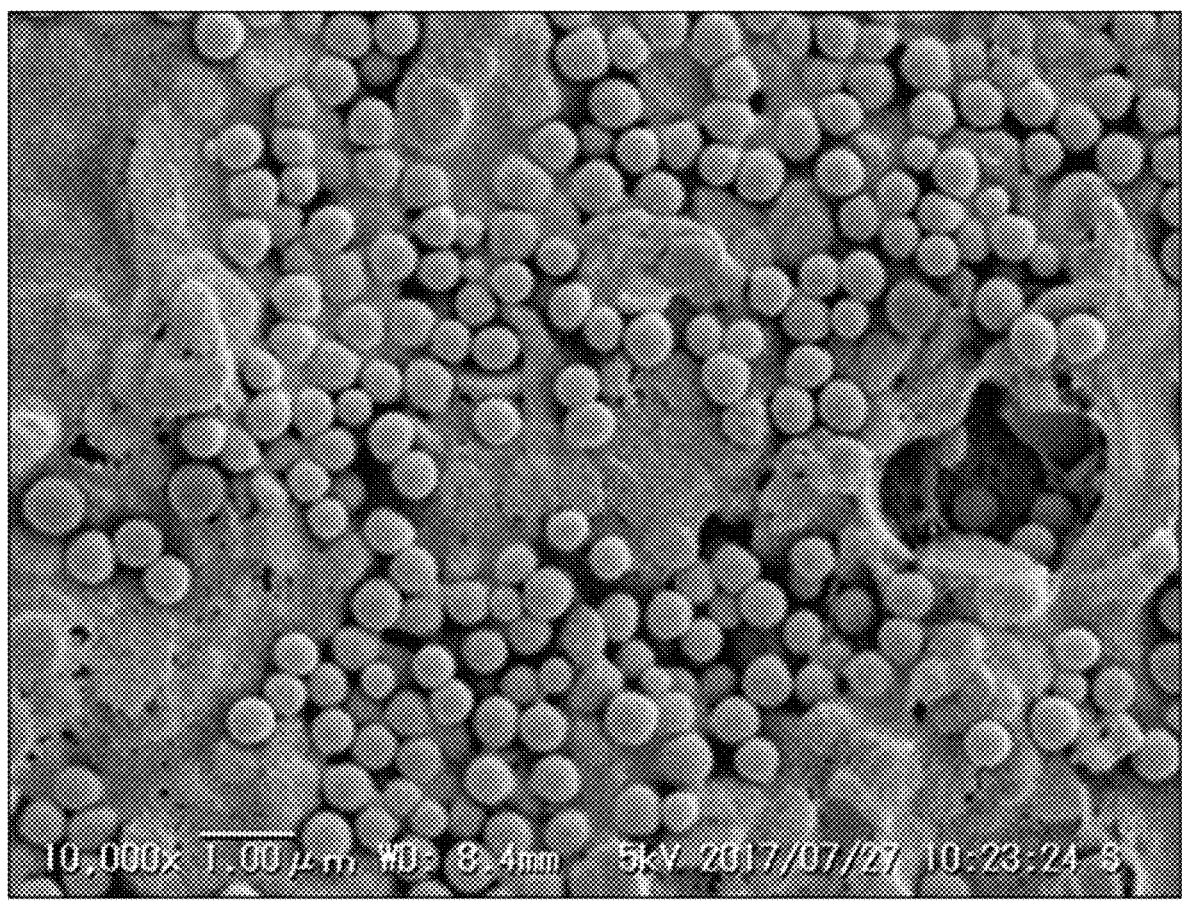
FIG. 3C is an electron microscopic image of a surface of an embodiment example of the adhesive layer included in the first separator for a non-aqueous secondary battery. In this embodiment example, a porous coating film of the heat resistant porous layer contains a polyimide.

The adhesive layer in the first separator is a layer in which adhesive resin particles adhere to one or both sides of a layered body composed of the porous substrate and the heat resistant porous layer. The adhesive resin particles are formed of a particulate resin having adhesiveness to an electrode. The adhesive layer may have a structure in which a large number of adhesive resin particles are arranged adjacent to each other on a surface of the layered body, or may have a structure in which a large number of adhesive resin particles are scattered on a surface of the layered body. The adhesive layer may have a structure in which the adhesive resin particles are arranged in a single layer in a thickness direction, or may have a structure in which the adhesive resin particles are stacked in plural layers in the thickness direction. FIGS. 1C, 2C, and 3C illustrate scanning electron microscopic images (SEM images) of embodiment examples of the adhesive layer included in the first separator.

The heat resistant porous layer included in the first separator has a porous coating film containing at least one selected from the group consisting of a wholly aromatic polyamide, a polyamide imide, and a polyimide, which are heat resistant resins, and is thereby less likely to be peeled off from the porous substrate and has better toughness than a heat resistant porous layer formed by bonding inorganic particles to each other by a binder resin while having heat-resistance.

The adhesive layer included in the first separator has a structure in which the adhesive resin particles adhere to the porous coating film of the heat resistant porous layer or the porous substrate, and is thereby hardly peeled off from the heat resistant porous layer or the porous substrate and has excellent toughness.

Therefore, the first separator is unlikely to cause interfacial destruction between layers and cohesive failure in each of the layers. As a result, it is presumed that the entire separator has a high adhesive strength to an electrode.

<Second Separator for Non-aqueous Secondary Battery>

The second separator for a non-aqueous secondary battery (also referred to as "second separator") includes a porous substrate, a heat resistant porous layer that is provided on one side or on both sides of the porous substrate, and an adhesive layer that is provided on one side or on both sides of a layered body composed of the porous substrate and the heat resistant porous layer.

The heat resistant porous layer in the second separator contains a heat resistant resin having at least one of an amide bond or an imide bond in a molecule and/or inorganic particles. The heat resistant porous layer thereby has heat resistance.

The second separator has a peel strength between the porous substrate and the heat resistant porous layer of from 5 N/m to 75 N/m. In a case where the second separator has heat resistant porous layers on both sides of the porous substrate, the peel strength between the porous substrate and the heat resistant porous layers is in the above range on both sides of the porous substrate.

Figure 4A:
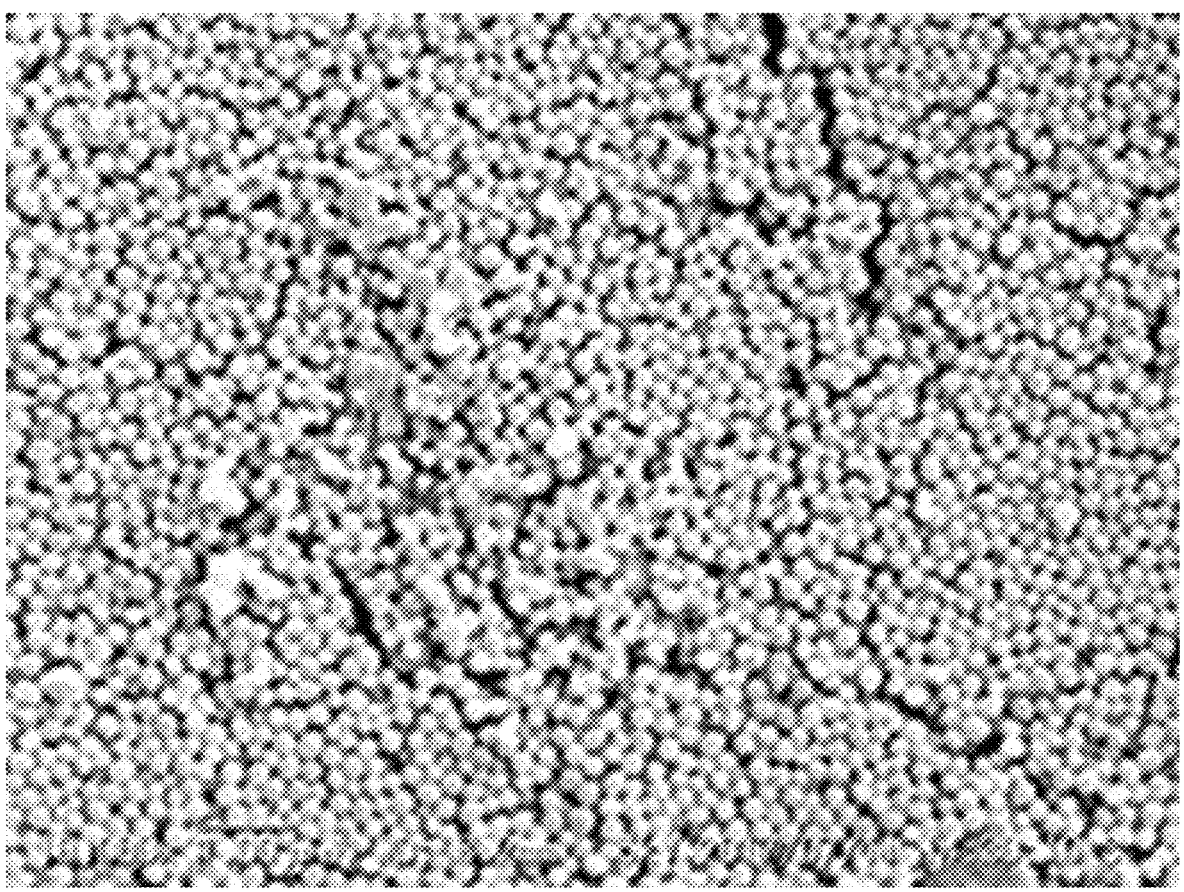
FIG. 4A is an electron microscopic image of a surface of an embodiment example of an adhesive layer included in a second separator for a non-aqueous secondary battery.

The adhesive layer in the second separator is a layer in which adhesive resin particles adhere to one or both sides of a layered body composed of the porous substrate and the heat resistant porous layer. The adhesive resin particles are formed of a particulate resin having adhesiveness to an electrode. The adhesive layer may have a structure in which a large number of adhesive resin particles are arranged adjacent to each other on a surface of the layered body, or may have a structure in which a large number of adhesive resin particles are scattered on a surface of the layered body. The adhesive layer may have a structure in which the adhesive resin particles are arranged in a single layer in a thickness direction, or may have a structure in which the adhesive resin particles are stacked in plural layers in the thickness direction. FIG. 4A illustrates a scanning electron microscopic image (SEM image) of an embodiment example of the adhesive layer included in the second separator.

The second separator has a peel strength between the porous substrate and the heat resistant porous layer of from 5 N/m to 75 N/m, and the heat resistant porous layer is hardly peeled off from the porous substrate.

The adhesive layer included in the second separator has a structure in which the adhesive resin particles adhere to the heat resistant porous layer or the porous substrate, and is thereby hardly peeled off from the heat resistant porous layer or the porous substrate.

Therefore, the second separator is unlikely to cause interfacial destruction between layers. As a result, it is presumed that the entire separator has a high adhesive strength to an electrode.

A layer configuration of the separator of the present disclosure will be described with reference to the drawings.

Each of FIGS. 5A to 5D is a schematic cross-sectional view of an embodiment example of the separator of the present disclosure. Each of FIGS. 5A to 5D is a schematic cross-sectional view mainly for explaining the order of stacking layers, and the structure of each of the layers is omitted or simplified. In FIGS. 5A to 5D, layers having similar functions are denoted by the same reference numeral and described.

Figure 5A:
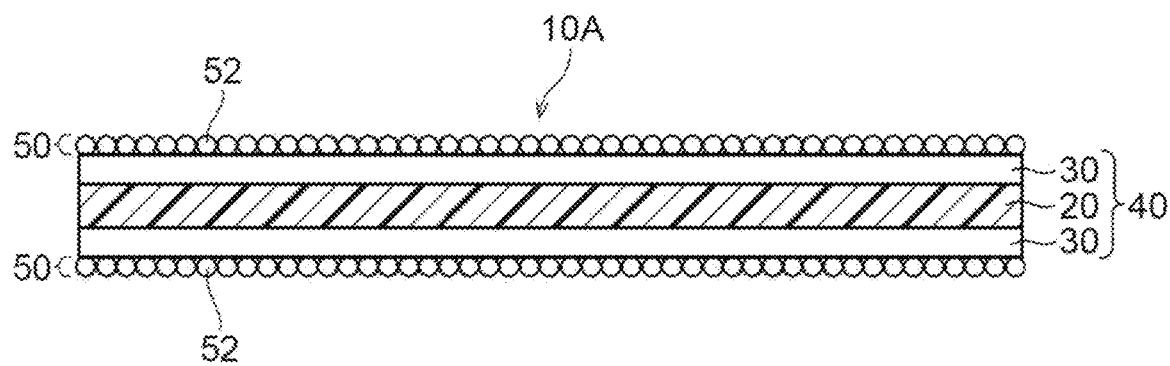
FIG. 5A is a schematic sectional view of an embodiment example of a separator for a non-aqueous secondary battery of the present disclosure.

A separator 10A illustrated in FIG. 5A has heat resistant porous layers 30 disposed on both sides of a porous substrate 20, and has adhesive layers 50 disposed on both sides of a layered body 40 composed of the porous substrate 20 and the two heat resistant porous layers 30.

Figure 5B:
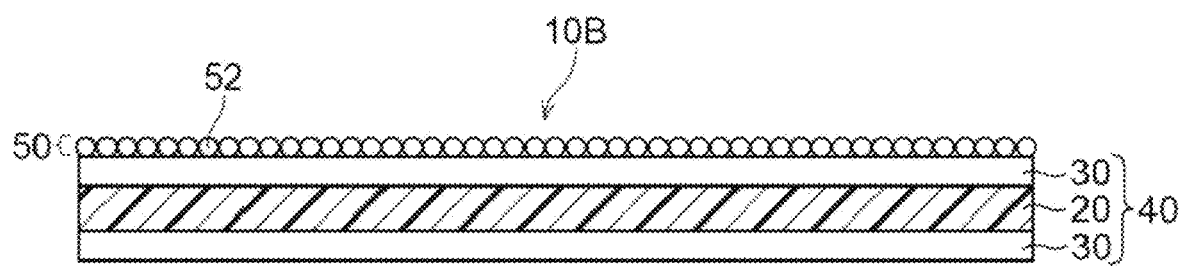
FIG. 5B is a schematic cross-sectional view of an embodiment example of the separator for a non-aqueous secondary battery of the present disclosure.

A separator 10B illustrated in FIG. 5B has the heat resistant porous layers 30 disposed on both sides of the porous substrate 20, and has the adhesive layer 50 disposed on one side of the layered body 40 composed of the porous substrate 20 and the two heat resistant porous layers 30.

Figure 5C:
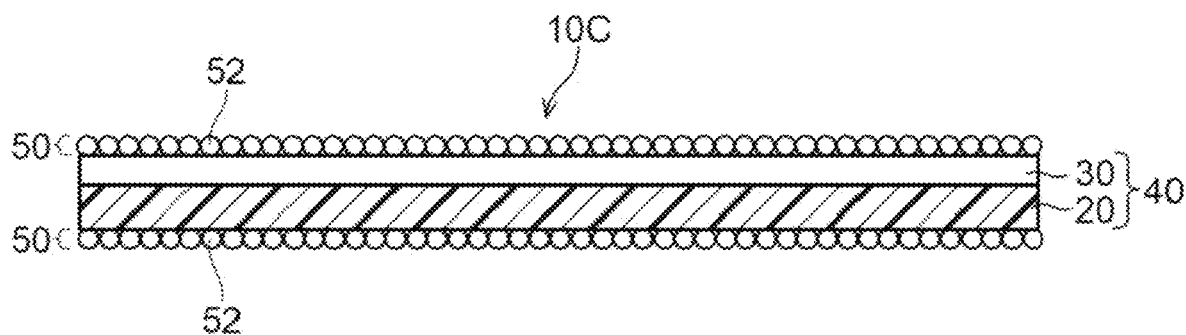
FIG. 5C is a schematic cross-sectional view of an embodiment example of the separator for a non-aqueous secondary battery of the present disclosure.

A separator 10C illustrated in FIG. 5C has the heat resistant porous layer 30 disposed on one side of the porous substrate 20, and has the adhesive layers 50 disposed on both sides of the layered body 40 composed of the porous substrate 20 and the one heat resistant porous layer 30.

Figure 5D:
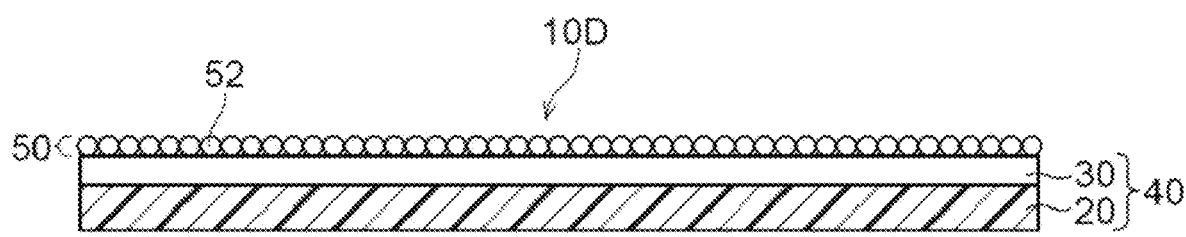
FIG. 5D is a schematic cross-sectional view of an embodiment example of the separator for a non-aqueous secondary battery of the present disclosure.

A separator 10D illustrated in FIG. 5D has the heat resistant porous layer 30 disposed on one side of the porous substrate 20, and has the adhesive layer 50 disposed on one side of the layered body 40 composed of the porous substrate 20 and the one heat resistant porous layer 30. In the separator 10D, the adhesive layer 50 is disposed on a surface of the heat resistant porous layer 30.

The heat resistant porous layer 30 is disposed on a surface of the porous substrate 20. The heat resistant porous layer 30 may be provided only on one side of the porous substrate 20, or may be provided on both sides of the porous substrate 20. When the heat resistant porous layers 30 are provided on both sides of the porous substrate 20, the heat resistance of the separator is better, and the safety of a battery can be further improved. In addition, the separator is less likely to be curled, and has excellent handleability during production of a battery. When the heat resistant porous layer 30 is provided only on one side of the porous substrate 20, the separator has better ion permeability. In addition, the thickness of the entire separator can be suppressed, and a battery having a higher energy density can be produced.

The adhesive layer 50 is disposed on a surface of the porous substrate 20 or the heat resistant porous layer 30, and exists as an outermost layer of the separator. The adhesive layer 50 may be provided only on one side of the layered body 40 or may be provided on both sides of the layered body 40. In a case where the adhesive layer 50 is provided only on one side of the layered body 40, the adhesive layer 50 is preferably disposed on a surface of the heat resistant porous layer 30. Whether the adhesive layer 50 is disposed on one side or both sides of the layered body 40 may be selected according to the composition or surface properties of a positive or a negative electrode of a battery. When the adhesive layer 50 is provided only on one side of the layered body 40, the thickness of the entire separator can be suppressed, and a battery having a higher energy density can be produced.

The adhesive layer 50 is a layer in which the adhesive resin particles 52 adhere to a surface of the layered body 40. In each of the separators 10A to 10D, the adhesive layer 50 has a structure in which a large number of the adhesive resin particles 52 are arranged adjacent to each other on a surface of the layered body 40, and has a structure in which the adhesive resin particles 52 are arranged in a single layer in a thickness direction. However, the structure of the adhesive layer 50 is not limited to the above structure. The adhesive layer 50 may have a structure in which the large number of adhesive resin particles 52 are scattered on a surface of the layered body 40, or a structure in which the adhesive resin particles 52 are stacked in plural layers in a thickness direction. The adhesive layer 50 preferably has a structure in which the large number of adhesive resin particles 52 are arranged adjacent to each other on a surface of the layered body 40 from a viewpoint of better adhesiveness to an electrode, and preferably has a structure in which the adhesive resin particles 52 are arranged in a single layer in a thickness direction from a viewpoint of increasing the energy density of a battery.

Hereinafter, the details of the porous substrate, the heat resistant porous layer, and the adhesive layer included in the separator of the present disclosure will be described.

[Porous Substrate]

The porous substrate in the present disclosure refers to a substrate having pores or voids therein. As the substrate, a microporous film; a porous sheet such as non-woven fabric and paper, composed of a fibrous material; and the like may be listed. In the present disclosure, from the viewpoint of thinning and strengthen of a separator, microporous film is preferable. The microporous film refers to a film having plural micropores therein, having a structure in which these micropores are connected to each other, and allowing gas or liquid to pass from one surface to the other surface.

As the material for the porous substrate, materials having electrical insulation are preferably used and any of organic materials and inorganic materials may be used.

It is preferred that the porous substrate contains a thermoplastic resin, from a viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a non-aqueous secondary battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the microporous film contains polypropylene, from the viewpoint of imparting thermal resistance to the extent that the film is not easily broken when exposed to a high temperature.

It is preferred that the polyolefin microporous film contains polyethylene and polypropylene, from the viewpoint of imparting shutdown function and thermal resistance that the film is not easily broken when exposed to a high temperature. As the polyolefin microporous film, a microporous film in which polyethylene and polypropylene are present in a mixed state in a layer may be listed. It is preferred that the microporous film contains 95% by mass or more of polyethylene and 5% by mass or less of polypropylene, from the viewpoint of compatibility of the shutdown function and thermal resistance. In addition, from the viewpoint of compatibility of the shutdown function and thermal resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be provided to the microporous film. Meanwhile, the polyolefin has a Mw of 5,000,000 or less, the shutdown characteristic of the microporous film is good, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; thermal resistant resins such as wholly aromatic polyamide, polyamide imide, polyimide, polyethersulfone, polysulfone, polyetherketone and polyetherimide; cellulose; and the like, or paper may be mentioned.

The surface of the porous substrate may be subjected to various surface treatments within the range of not impairing the nature of the porous substrate, for the purpose of improving wettability with the coating liquid for forming the heat resistant porous layer or the dispersing liquid for resin particles for forming the adhesive porous layer. As the surface treatment, corona treatment, plasma treatment, flame treatment, UV irradiation treatment, and the like may be mentioned.

[Characteristics of Porous Substrate]

The thickness of the porous substrate is preferably 10.0 µm or less, more preferably 8.0 µm or less, from the viewpoint of enhancing energy density of the battery, and is preferably 3.0 µm or more, more preferably 5.0 µm or more, from the viewpoint of production yield of the separator and production yield of the battery.

The Gurley value of the porous substrate (JIS P8117: 2009) is preferably from 50 sec/100 ml to 400 sec/100 ml, more preferably from 50 sec/100 ml to 200 sec/100 ml, from the viewpoint of preventing short circuit a battery or obtaining sufficient ion permeability.

It is preferred that the porosity of the porous substrate is from 20 to 60%, from the viewpoint of obtaining proper film resistance or shutdown function. The porosity of each of the porous substrate is determined according to the following calculation method.

In a case in which constituent materials are a, b, c, . . . , n; the masses of each of the constituent materials are Wa, Wb, Wc, . . . , Wn (g/cm$^2$); the true densities of each of the constituent materials are da, db, dc, . . . , dn (g/cm$^3$), and the thickness is t (cm), the porosity F (%) is determined by the following formula.

$$\varepsilon = \{1-(Wa/da+Wb/db+Wc/dc+\ldots+Wn/dn)/t\} \times 100$$

The piercing strength of the porous substrate is preferably 200 g or more from the viewpoint of improving a production yield of the separator and production yield of the battery. The piercing strength of the porous substrate is measured by performing a piercing test under the condition of a curvature radius of a needle tip of 0.5 mm, and a piercing speed of 2 mm/sec, using a KES-G5 handy compression tester from KATO TECH CO., LTD., to obtain a maximum piercing load (g).

[Heat Resistant Porous Layer in First Separator]

The heat resistant porous layer in the first separator has a porous coating film containing at least one selected from the group consisting of a wholly aromatic polyamide, a polyamide imide, and a polyimide. The porous coating film is a coating film having a large number of micropores and allowing gas or liquid to pass therethrough from one surface to the other. The porous coating film can be confirmed with a scanning electron microscope. By observing a cross section of the separator or observing an outer surface of the heat resistant porous layer from a direction perpendicular to the surface, a resin portion forming the outer surface of the heat resistant porous layer and spreading like a film can be observed, and it can be observed that a large number of pores are formed in the resin portion. The dense porous coating film having micropores can be formed on a porous substrate by adjusting the composition of a coating liquid or a coagulation liquid in a wet coating method described below.

In a case where the heat resistant porous layer has the porous coating film, in a form in which the adhesive layer is disposed on a surface of the heat resistant porous layer, due to adhesion of the adhesive resin particles to the porous coating film, interfacial destruction between the heat resistant porous layer and the adhesive layer hardly occurs. In addition, in a case where the heat resistant porous layer has the porous coating film, the heat resistant porous layer has excellent toughness, and cohesive failure of the heat resistant porous layer hardly occurs.

The porous coating film is a dense coating film forming an outer surface of the heat resistant porous layer and having micropores. The average pore diameter of the micropores of the porous coating film is preferably 1000 nm or less, more preferably 800 nm or less, and still more preferably 500 nm or less from a viewpoint that the adhesive resin particles are hardly peeled off from the heat resistant porous layer, and is preferably 1 nm or more, more preferably 5 nm or more, and still more preferably 10 nm or more from a viewpoint of ion permeability.

The coverage of the porous coating film on an outer surface of the heat resistant porous layer is preferably 60% or more, more preferably 70% or more, and still more preferably 80% or more with respect to the area of the heat resistant porous layer in planar view.

A wholly aromatic polyamide is suitable for the heat resistant porous layer from a viewpoint of durability among heat resistant resins. A meta type or para type wholly aromatic polyamide may be used. Among wholly aromatic polyamides, a meta type wholly aromatic polyamide is preferable from viewpoints of easy formation of a porous layer and excellent oxidation-reduction resistance in an electrode reaction. As a wholly aromatic polyamide, specifically, polymetaphenylene isophthalamide or polyparaphenylene terephthalamide is preferable, and polymetaphenylene isophthalamide is more preferable. The weight average molecular weight of the wholly aromatic polyamide contained in the heat resistant porous layer is preferably from $1 \times 10^3$ to $1 \times 10^7$, more preferably from $5 \times 10^3$ to $5 \times 10^6$, and still more preferably from $1 \times 10^4$ to $1 \times 10^6$.

A polyamide imide is suitable for the heat resistant porous layer from a viewpoint of heat resistance among heat resistant resins. The weight average molecular weight of a polyamide imide contained in the heat resistant porous layer is preferably from $1 \times 10^3$ to $1 \times 10^7$, more preferably from $5 \times 10^3$ to $5 \times 10^6$, and still more preferably from $1 \times 10^4$ to $1 \times 10^6$.

A polyimide is suitable for the heat resistant porous layer from a viewpoint of heat resistance among heat resistant resins. As a polyimide, an aliphatic polyimide or an aromatic polyimide may be used. The weight average molecular weight of a polyimide contained in the heat resistant porous layer is preferably from $1 \times 10^3$ to $1 \times 10^7$, more preferably from $5 \times 10^3$ to $5 \times 10^6$, and still more preferably from $1 \times 10^4$ to $1 \times 10^6$.

The heat resistant porous layer in the first separator may contain a heat resistant resin other than a wholly aromatic polyamide, a polyamide imide, and a polyimide. Examples of the heat resistant resin other than a wholly aromatic polyamide, a polyamide imide, and a polyimide include a polysulfone, a polyethersulfone, a polyketone, a polyetherketone, a polyetherimide, a cellulose, and a polyvinylidene fluoride type resin. These heat resistant resins may be used singly or in combination of two or more kinds thereof. The content of the heat resistant resin other than a wholly aromatic polyamide, a polyamide imide, and a polyimide is preferably from 0% by mass to 50% by mass, more preferably from 0% by mass to 40% by mass, and still more preferably from 0% by mass to 30% by mass with respect to the total amount of all the resins contained in the heat resistant porous layer in order to maintain an effect of the wholly aromatic polyamide, the polyamide imide, or the polyimide.

The total amount of a wholly aromatic polyamide, a polyamide imide, and a polyimide contained in the heat resistant porous layer in the first separator is preferably 50% by mass or more, more preferably 70% by mass or more, and still more preferably 90% by mass or more with respect to the total amount of all the resins contained in the heat resistant porous layer.

The heat resistant porous layer in the first separator preferably contains inorganic particles from a viewpoint of heat resistance. The inorganic particles are contained in the heat resistant porous layer, for example, in a state of being bonded to each other and covered by the porous coating film.

Examples of the inorganic particles include particles of metal hydroxides such as aluminium hydroxide, magnesium hydroxide, calcium hydroxide, chromium hydroxide, zirconium hydroxide, cerium hydroxide, nickel hydroxide, or boron hydroxide; particles of metal oxides such as silica, alumina, zirconia or magnesium oxide; particles of carbonates such as calcium carbonate or magnesium carbonate; particles of sulfates such as barium sulfate or calcium sulfate. As the inorganic particles, particles of metal hydroxides or particles of metal oxides are preferable, from the viewpoint of stability to an electrolyte and electrochemical stability. The inorganic particles that are surface-modified with a silane coupling agent or the like can also be used.

The particle shape of the inorganic particles may be any shape, and may be spherical, elliptical, plate-shaped, needle-shaped, or irregular. From the viewpoint of preventing a short circuit of a battery, the inorganic particles contained in the heat resistant porous layer are preferably plate-shaped particles or primary particles that are not aggregated.

The inorganic particles may be used singly or in combination of two or more kinds thereof.

The volume average particle diameter of the inorganic particles is preferably from 0.01 µm to 10 µm. The lower limit thereof is more preferably 0.1 µm, and the upper limit thereof is more preferably 5 µm.

The particle size distribution of the inorganic particles is preferably 0.1 µm<d90−d10<3 µm. Here, d10 represents the particle diameter (µm) to which the cumulative total of the particles in the particle size distribution from the smaller particle size side is 10% by mass, and d90 represents the particle diameter (µm) to which the cumulative total of the particles in the particle size distribution from the smaller particle size side is 90% by mass. The particle size distribution measurement is performed, for example, by using a laser diffraction particle size analyzer (for example, Mastersizer 2000, manufactured by Sysmex Corporation), by using water as a dispersion medium, and by using a small amount of a nonionic surfactant, Triton X-100, as a dispersant.

In a case where the heat resistant porous layer in the first separator contains inorganic particles, the mass ratio of the inorganic particles in the heat resistant porous layer is preferably 50% by mass or more, more preferably 55% by mass or more, and still more preferably 60% by mass or more from a viewpoint of heat resistance. The mass ratio of the inorganic particles in the heat resistant porous layer is preferably 90% by mass or less, more preferably 85% by mass or less, and still more preferably 80% by mass or less from a viewpoint that the heat resistant porous layer is hardly peeled off from the porous substrate.

The heat resistant porous layer in the first separator may contain an organic filler. The organic filler is contained in the heat resistant porous layer in a state where particles thereof are bonded to each other and covered by the porous coating film.

Examples of the organic filler include crosslinked polymer particles of a crosslinked poly(meth)acrylic acid, a crosslinked poly(meth)acrylic acid ester, a crosslinked polysilicone, a crosslinked polystyrene, a crosslinked polydivinylbenzene, a crosslinked product of a styrene-divinylbenzene copolymer, a melamine resin, a phenol resin, a benzoguanamine-formaldehyde condensate, or the like; and heat resistant polymer particles of polysulfone, polyacrylonitrile, aramide, polyacetal, or the like. The organic filler may be used singly or in combination of two or more thereof.

The heat resistant porous layer in the first separator may contain an additive, for example, a dispersing agent such as a surfactant, a wetting agent, a defoamer, a pH adjusting agent or the like. The dispersing agent is added to the coating liquid for forming the heat resistant porous layer, for the purpose of improving dispersibility, coatability and preservation stability. The wetting agent, defoamer and pH adjusting agent are added to the coating liquid for forming the heat resistant porous layer, for example, for being well-mixed with the porous substrate, for suppressing air entrainment to the coating liquid, or for pH adjustment.

[Heat Resistant Porous Layer in Second Separator]

The heat resistant porous layer in the second separator contains a heat resistant resin having at least one of an amide bond or an imide bond in a molecule and/or inorganic particles. The heat resistant porous layer has a large number of micropores, and allows gas or liquid to pass therethrough from one surface to the other surface.

In the present disclosure, the heat resistant resin having at least one of an amide bond or an imide bond in a molecule is referred to as "specific heat resistant resin".

The specific heat resistant resin in the heat resistant porous layer may be a fibril-like coating film or a porous coating film (details will be described later) to form a three-dimensional network structure, or may be contained as a binder resin for connecting inorganic particles to each other. The specific heat resistant resin in the heat resistant porous layer may be formed of resin particles, and the resin particles of the specific heat resistant resin may be connected to each other, or the resin particles of the specific heat resistant resin may be connected to the inorganic particles to form a heat resistant porous layer.

Examples of the specific heat resistant resin (heat resistant resin having at least one of an amide bond or an imide bond in a molecule) include a wholly aromatic polyamide, a polyamide imide, a polyimide, and a polyetherimide. These resins may be used singly or in combination of two or more kinds thereof.

The weight average molecular weight of the specific heat resistant resin contained in the heat resistant porous layer is preferably from $1\times10^3$ to $1\times10^7$, more preferably from $5\times10^3$ to $5\times10^6$, and still more preferably from $1\times10^4$ to $1\times10^6$.

Among the specific heat resistant resins, a wholly aromatic polyamide is preferable from a viewpoint of durability. A meta type or para type wholly aromatic polyamide may be used. Among wholly aromatic polyamides, a meta type wholly aromatic polyamide is preferable from viewpoints of easy formation of a porous layer and excellent oxidation-reduction resistance in an electrode reaction. As a wholly aromatic polyamide, specifically, polymetaphenylene isophthalamide or polyparaphenylene terephthalamide is preferable, and polymetaphenylene isophthalamide is more preferable. The weight average molecular weight of the wholly aromatic polyamide contained in the heat resistant porous layer is preferably from $1\times10^3$ to $1\times10^7$, more preferably from $5\times10^3$ to $5\times10^6$, and still more preferably from $1\times10^4$ to $1\times10^6$.

The heat resistant porous layer in the second separator may contain a heat resistant resin other than the specific heat resistant resin. Examples of the heat resistant resin other than the specific heat resistant resin include a polysulfone, a polyether sulfone, a polyketone, a polyether ketone, a cellulose, and a polyvinylidene fluoride type resin. These heat resistant resins may be used singly or in combination of two or more kinds thereof. The content of the heat resistant resin other than the specific heat resistant resin is preferably from 0% by mass to 50% by mass, more preferably from 0% by mass to 40% by mass, and still more preferably from 0% by mass to 30% by mass with respect to the total amount of all the resins contained in the heat resistant porous layer in order to maintain an effect of the specific heat resistant resin.

In a case where the heat resistant porous layer in the second separator contains the specific heat resistant resin, the total amount of the specific heat resistant resins contained in the heat resistant porous layer is preferably 50% by mass or more, more preferably 70% by mass or more, and still more preferably 90% by mass or more with respect to the total amount of all the resins contained in the heat resistant porous layer.

In a case where the heat resistant porous layer in the second separator contains inorganic particles, the heat resistant porous layer does not need to contain the specific heat resistant resin. In this case, the heat resistant porous layer contains the inorganic particles and a binder resin (for example, an acrylic type resin).

The heat resistant porous layer in the second separator preferably contains inorganic particles, from the viewpoint of heat resistance.

Examples of the inorganic particles include particles of metal hydroxides such as aluminium hydroxide, magnesium hydroxide, calcium hydroxide, chromium hydroxide, zirconium hydroxide, cerium hydroxide, nickel hydroxide, or boron hydroxide; particles of metal oxides such as silica, alumina, zirconia or magnesium oxide; particles of carbonates such as calcium carbonate or magnesium carbonate; particles of sulfates such as barium sulfate or calcium sulfate. As the inorganic particles, particles of metal hydroxides or particles of metal oxides are preferable, from the viewpoint of stability to an electrolyte and electrochemical stability. The inorganic particles that are surface-modified with a silane coupling agent or the like can also be used.

The particle shape of the inorganic particles may be any shape, and may be spherical, elliptical, plate-shaped, needle-shaped, or irregular. From the viewpoint of preventing a short circuit of a battery, the inorganic particles contained in the heat resistant porous layer are preferably plate-shaped particles or primary particles that are not aggregated.

The inorganic particles may be used singly or in combination of two or more kinds thereof.

The volume average particle diameter of the inorganic particles is preferably from 0.01 μm to 10 μm. The lower limit thereof is more preferably 0.1 μm, and the upper limit thereof is more preferably 5 μm.

The particle size distribution of the inorganic particles is preferably 0.1 μm<d90−d10<3 μm. Here, d10 represents the particle diameter (μm) to which the cumulative total of the particles in the particle size distribution from the smaller particle size side is 10% by mass, and d90 represents the particle diameter (μm) to which the cumulative total of the particles in the particle size distribution from the smaller particle size side is 90% by mass. The particle size distribution measurement is performed, for example, by using a laser diffraction particle size analyzer (for example, Mastersizer 2000, manufactured by Sysmex Corporation), by using water as a dispersion medium, and by using a small amount of a nonionic surfactant, Triton X-100, as a dispersant.

In a case where the heat resistant porous layer in the second separator contains inorganic particles, the mass ratio of the inorganic particles in the heat resistant porous layer is preferably 50% by mass or more, more preferably 55% by mass or more, and still more preferably 60% by mass or more from a viewpoint of heat resistance. The mass ratio of the inorganic particles in the heat resistant porous layer is preferably 90% by mass or less, more preferably 85% by mass or less, and still more preferably 80% by mass or less from a viewpoint that the heat resistant porous layer is hardly peeled off from the porous substrate.

It is preferable that the heat resistant porous layer in the second separator contains at least the specific heat resistant resin and further contains inorganic particles.

The heat resistant porous layer in the second separator preferably has a porous coating film containing the specific heat resistant resin. The porous coating film is a coating film having a large number of micropores and allowing gas or liquid to pass therethrough from one surface to the other. The porous coating film can be confirmed with a scanning electron microscope. By observing a cross section of the separator or observing an outer surface of the heat resistant porous layer from a direction perpendicular to the surface, a resin portion forming the outer surface of the heat resistant porous layer and spreading like a film can be observed, and it can be observed that a large number of pores are formed in the resin portion. The dense porous coating film having micropores can be formed on a porous substrate by adjusting the composition of a coating liquid or a coagulation liquid in a wet coating method described below.

Examples of the form of the heat resistant porous layer having a porous coating film include the following forms (a') to (d'). Preferable forms (kind, molecular weight, size, shape, and the like) of the specific heat resistant resin and the inorganic particles in forms (a') to (d') are as described above.

Form (a'): The heat resistant porous layer is a porous coating film itself containing the specific heat resistant resin.

Form (b'): The heat resistant porous layer includes an inner layer formed on a porous substrate and containing the specific heat resistant resin, and a porous coating film formed so as to cover an outer surface of the inner layer and containing the specific heat resistant resin. The inner layer has a porous structure having a larger pore diameter than the porous coating film. The heat resistant porous layer has a so-called skin-core structure as a whole.

Form (c'): The heat resistant porous layer further contains inorganic particles, and the inorganic particles are bonded to each other and covered by a porous coating film containing the specific heat resistant resin.

Form (d'): The heat resistant porous layer includes an inner layer formed on a porous substrate and containing the specific heat resistant resin and inorganic particles, and a porous coating film formed so as to cover an outer surface of the inner layer and containing the specific heat resistant resin. In the inner layer, inorganic particles are bonded to each other by the specific heat resistant resin, and the inner layer has a porous structure having a larger pore diameter than the porous coating film. The heat resistant porous layer has a so-called skin-core structure as a whole.

Figure 4B:
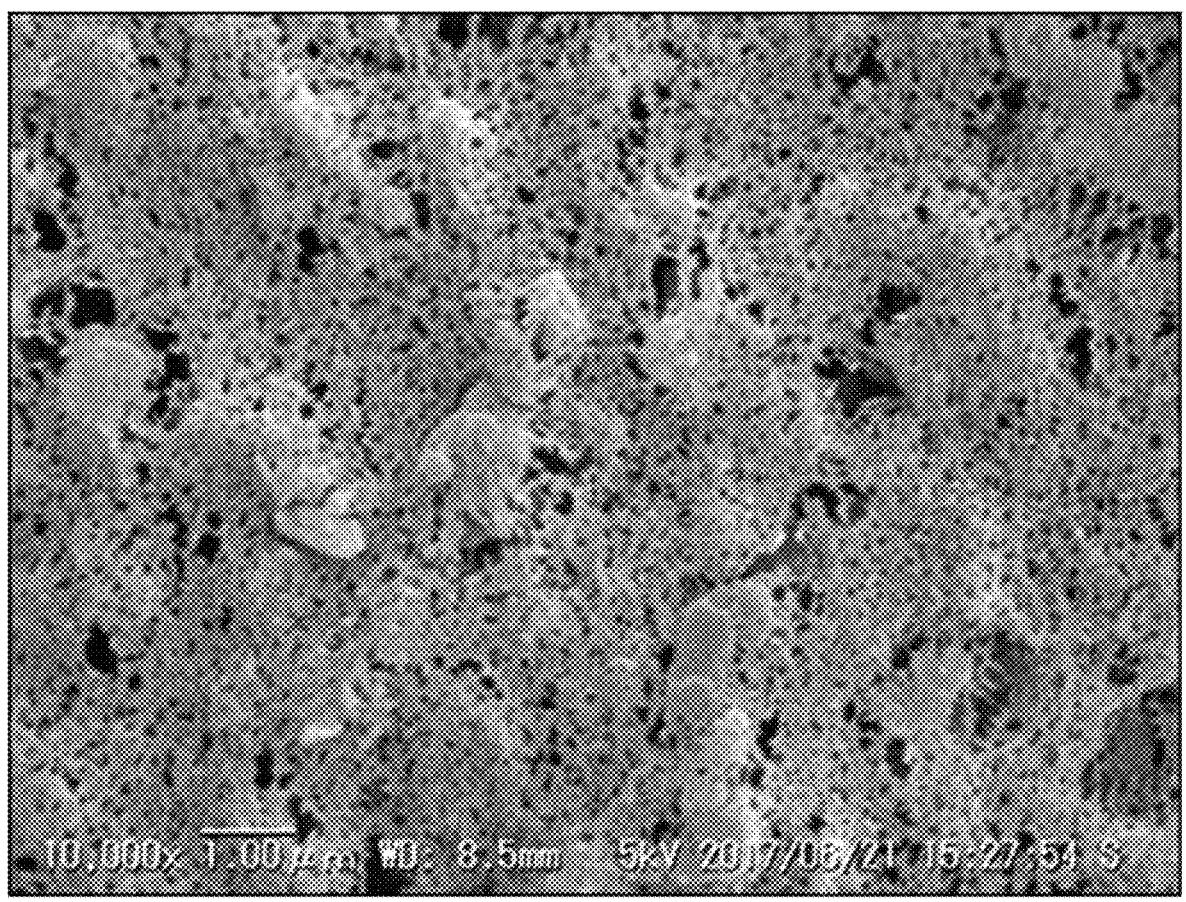
FIG. 4B is an electron microscopic image of an outer surface of an embodiment example of a heat resistant porous layer included in the second separator for a non-aqueous secondary battery.
Figure 4C:
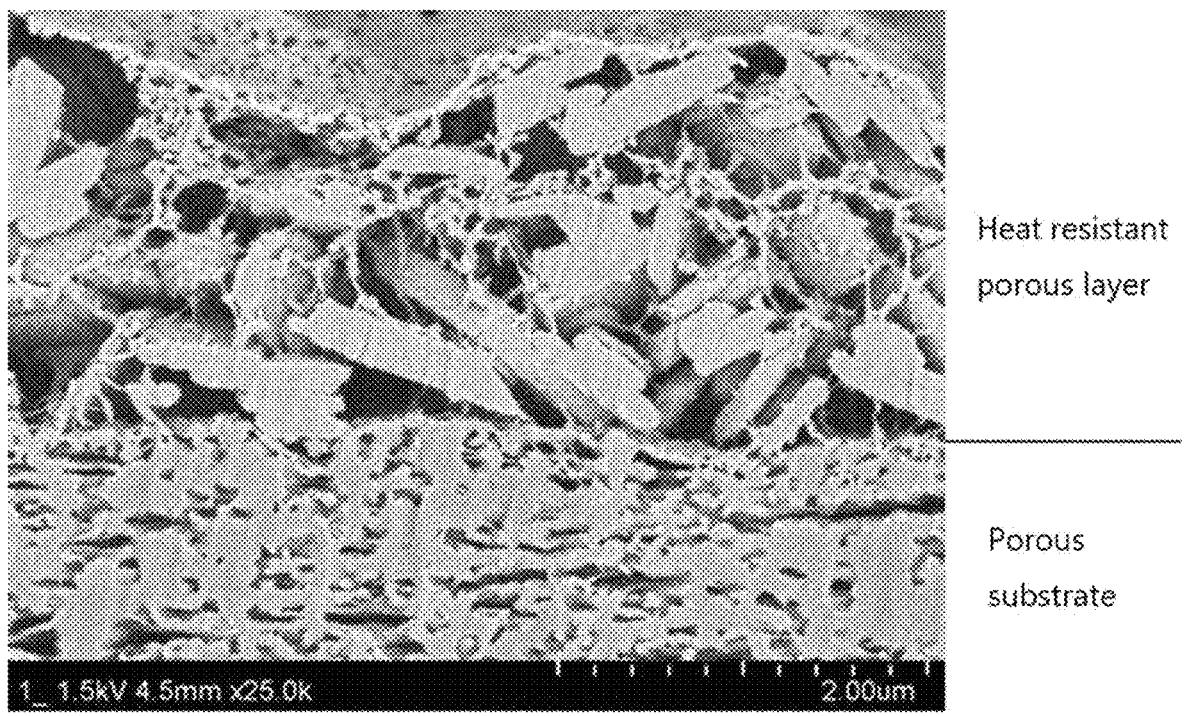
FIG. 4C is an electron microscopic image of a cross section of an embodiment example of the heat resistant porous layer and a porous substrate included in the second separator for a non-aqueous secondary battery.

FIGS. 4B and 4C illustrate scanning electron microscopic images (SEM images) of an embodiment example of the heat resistant porous layer included in the second separator. The heat resistant porous layer illustrated in FIGS. 4B and 4C contains the specific heat resistant resin and inorganic particles. FIG. 4B is an SEM image of an outer surface (a surface farther from the porous substrate) of the heat resistant porous layer, and FIG. 4C is an SEM image of cross sections of the heat resistant porous layer and the porous substrate. The porous coating film is a coating film forming an outer surface of the heat resistant porous layer, and is a dense coating film having micropores.

In a case where the heat resistant porous layer in the second separator has the porous coating film, in a form in which the adhesive layer is disposed on a surface of the heat resistant porous layer, due to adhesion of the adhesive resin particles to the porous coating film, interfacial destruction between the heat resistant porous layer and the adhesive layer hardly occurs. In addition, in a case where the heat resistant porous layer has the porous coating film, the heat resistant porous layer has excellent toughness, and cohesive failure of the heat resistant porous layer hardly occurs.

The heat resistant porous layer in the second separator may contain an organic filler. The organic filler is contained in the heat resistant porous layer, for example, in a state where particles thereof are bonded to each other by the specific heat resistant resin or in a state where particles thereof are bonded to each other and covered by the porous coating film.

Examples of the organic filler include crosslinked polymer particles of a crosslinked poly(meth)acrylic acid, a crosslinked poly(meth)acrylic acid ester, a crosslinked polysilicone, a crosslinked polystyrene, a crosslinked polydivinylbenzene, a crosslinked product of a styrene-divinylbenzene copolymer, a melamine resin, a phenol resin, a benzoguanamine-formaldehyde condensate, or the like; and heat resistant polymer particles of polysulfone, polyacrylonitrile, aramide, polyacetal, or the like. The organic filler may be used singly or in combination of two or more thereof.

The heat resistant porous layer in the second separator may contain an additive, for example, a dispersing agent such as a surfactant, a wetting agent, a defoamer, a pH adjusting agent or the like. The dispersing agent is added to the coating liquid for forming the heat resistant porous layer, for the purpose of improving dispersibility, coatability and preservation stability. The wetting agent, defoamer and pH adjusting agent are added to the coating liquid for forming the heat resistant porous layer, for example, for being well-mixed with the porous substrate, for suppressing air entrainment to the coating liquid, or for pH adjustment.

[Characteristics of Heat Resistant Porous Layer]

In the separator of the present disclosure, the thickness of the heat resistant porous layer is preferably 0.5 μm or more on one surface and more preferably 1.0 μm or more on one surface from a viewpoint of heat resistance or handleability of the separator, and is preferably 5.0 μm or less on one surface, and more preferably 4.0 μm or less on one surface from a viewpoint of handleability of the separator or energy density of a battery. The thickness of the heat resistant porous layer is preferably 1.0 μm or more, more preferably 2.0 μm or more, and preferably 10.0 μm or less, more preferably 8.0 μm or less as a total thickness thereof on both surfaces of the porous substrate even if the heat resistant porous layer is provided only on one surface of the porous substrate or on both surfaces thereof.

The weight of the heat resistant porous layer in the separator of the present disclosure is, as a total weight thereof on both surfaces, preferably 1.0 g/m$^2$ or more and more preferably 2.0 g/m$^2$ or more from a viewpoint of heat resistance or handleability of the separator, and is preferably 10.0 g/m$^2$ or less, and more preferably 8.0 g/m$^2$ or less from a viewpoint of handleability of the separator or energy density of a battery.

In the separator of the present disclosure, the porosity of the heat resistant porous layer is preferably 40% or more, more preferably 50% or more, and still more preferably 60% or more from a viewpoint of ion permeability of the separator, and is preferably 90% or less, more preferably 80% or less, and still more preferably 70% or less from a viewpoint of thermal dimensional stability of the separator. A method of determining the porosity of the heat resistant porous layer is similar to a method of determining the porosity of the porous substrate.

In the separator of the present disclosure, the peel strength between the porous substrate and the heat resistant porous layer is preferably 5 N/m or more, more preferably 10 N/m or more, still more preferably 15 N/m or more, and further still more preferably 20 N/m or more from a viewpoint of the adhesive strength of the separator to an electrode. The peel strength is preferably 75 N/m or less, more preferably 60 N/m or less, and still more preferably 50 N/m or less from a viewpoint of ion permeability. In a case where the separator of the present disclosure has heat resistant porous layers on both sides of the porous substrate, the peel strength between the porous substrate and the heat resistant porous layers is preferably in the above range on both sides of the porous substrate.

[Adhesive Layer]

In the separator of the present disclosure, the adhesive layer has a structure in which adhesive resin particles adhere to one or both sides of the layered body composed of the porous substrate and the heat resistant porous layer. The adhesive layer allows gas or liquid to pass therethrough from one surface to the other surface by a gap existing between the adhesive resin particles. The structure in which the adhesive resin particles adhere includes, of course, a form in which a resin maintains a particle shape in a completed separator, and also includes a form in which some of resin particles are melted by a heat treatment or a drying treatment and do not maintain a particle shape in a separator completed by using resin particles as a material of the adhesive layer.

Since the adhesive layer has a structure in which the adhesive resin particles adhere to the heat resistant porous layer or the porous substrate, interfacial destruction between the adhesive layer and the heat resistant porous layer or the porous substrate hardly occurs. In addition, since the adhesive layer has a structure in which the adhesive resin particles adhere to each other and are connected to each other, the adhesive layer has excellent toughness, and cohesive failure of the adhesive layer hardly occurs.

The adhesive resin particles are formed of a particulate resin having adhesiveness to an electrode of a battery. The kind of the resin of the adhesive resin particles may be selected according to the composition of a positive electrode or a negative electrode. The adhesive resin particles are preferably resin particles that are stable to an electrolytic solution and electrochemically stable.

Examples of the adhesive resin particles include particles containing a polyvinylidene fluoride type resin, a fluorine type rubber, an acrylic type resin, a styrene-butadiene copolymer, a homopolymer or a copolymer of a vinyl nitrile compound (acrylonitrile, methacrylonitrile, or the like), carboxymethyl cellulose, a hydroxyalkyl cellulose, a polyvinyl alcohol, a polyvinyl butyral, a polyvinyl pyrrolidone, a polyether (polyethylene oxide, polypropylene oxide, or the like), or any mixture of two or more kinds thereof. Among these particles, particles containing a polyvinylidene fluoride type resin and/or an acrylic type resin are preferable from a viewpoint of excellent oxidation resistance.

Examples of the polyvinylidene fluoride type resin include a homopolymer of vinylidene fluoride (that is, polyvinylidene fluoride); a copolymer of vinylidene fluoride and another monomer (polyvinylidene fluoride copolymer); and a mixture of polyvinylidene fluoride and a polyvinylidene fluoride copolymer. Examples of the monomer copolymerizable with vinylidene fluoride include tetrafluoroethylene, hexafluoropropylene, trifluoroethylene, chlorotrifluoroethylene, trichloroethylene, vinyl fluoride, trifluoroperfluoropropyl ether, ethylene, (meth)acrylic acid, methyl (meth)acrylate, (meth)acrylate, vinyl acetate, vinyl chloride, and acrylonitrile. These monomers may be used singly or in combination of two or more kinds thereof.

The polyvinylidene fluoride copolymer contained in the adhesive resin particles is preferably a copolymer having 50 mol % or more of structural units derived from vinylidene fluoride from a viewpoint of obtaining mechanical strength that can withstand pressurization and heating during production of a battery.

The polyvinylidene fluoride copolymer contained in the adhesive resin particles is preferably a copolymer of vinylidene fluoride and tetrafluoroethylene, a copolymer of vinylidene fluoride and hexafluoropropylene, or a copolymer of vinylidene fluoride and trifluoroethylene, and more preferably a copolymer of vinylidene fluoride and hexafluoropropylene. The copolymer of vinylidene fluoride and hexafluoropropylene is preferably a copolymer containing 0.1 mol % to 10 mol % (preferably 0.5 mol % to 5 mol %) of structural units derived from hexafluoropropylene.

The weight average molecular weight of polyvinylidene fluoride or a polyvinylidene fluoride copolymer contained in the adhesive resin particles is preferably from 1000 to 5,000,000, more preferably from 10,000 to 3,000,000, and still more preferably from 50,000 to 2,000,000.

Examples of the acrylic type resin contained in the adhesive resin particles include a poly (meth)acrylic acid, a poly (meth)acrylate, a poly (meth)acrylic acid ester, a crosslinked poly (meth)acrylic acid, a crosslinked poly (meth)acrylate, and a crosslinked poly (meth)acrylic acid ester, and also include a modified acrylic type resin. These resins may be used singly or in combination of two or more kinds thereof. The acrylic type resin may be used as a mixture of polyvinylidene fluoride and an acrylic type resin or a mixture of a polyvinylidene fluoride copolymer and an acrylic type resin.

The adhesive resin particles are preferably polyvinylidene fluoride particles, polyvinylidene fluoride copolymer particles, particles of a mixture of polyvinylidene fluoride and a polyvinylidene fluoride copolymer, particles of a mixture of polyvinylidene fluoride and an acrylic type resin, or particles of a mixture of a polyvinylidene fluoride copolymer and an acrylic type resin. Here, the polyvinylidene fluoride copolymer is preferably a copolymer of vinylidene fluoride and tetrafluoroethylene, a copolymer of vinylidene fluoride and hexafluoropropylene, or a copolymer of vinylidene fluoride and trifluoroethylene.

The mixture of polyvinylidene fluoride and an acrylic type resin or the mixture of a polyvinylidene fluoride copolymer and an acrylic type resin, constituting the adhesive resin particles, preferably contains 20% by mass or more of polyvinylidene fluoride or a polyvinylidene fluoride copolymer from a viewpoint of oxidation resistance.

As the adhesive resin particles, two or more kinds of adhesive resin particles may be used in combination. It is preferable to use a mixture of first adhesive resin particles containing a polyvinylidene fluoride type resin and second adhesive resin particles containing an acrylic type resin from a viewpoint of adjusting the ion permeability of the adhesive layer, the adhesiveness of the adhesive layer to an electrode, the peel strength between the adhesive layer and the heat resistant porous layer, and the handleability of the adhesive layer in a well-balanced manner. The first adhesive resin particles (hereinafter, also referred to as "resin particles F") are particles containing a polyvinylidene fluoride type resin in an amount of more than 50% by mass with respect to the total solid content. The second adhesive resin particles (hereinafter, also referred to as "resin particles A") are particles containing an acrylic type resin in an amount of more than 50% by mass with respect to the total solid content.

Examples of the polyvinylidene fluoride type resin contained in the resin particles F include polyvinylidene fluoride, a polyvinylidene fluoride copolymer, and a mixture of polyvinylidene fluoride and a polyvinylidene fluoride copolymer, and preferable forms of these polymers are as described above. The resin particles F may contain a resin other than a polyvinylidene fluoride type resin.

The amount of a polyvinylidene fluoride type resin contained in the resin particles F is more than 50% by mass, preferably 70% by mass or more, more preferably 90% by mass or more, and still more preferably 100% by mass with respect to the total solid content of the resin particles F.

Examples of the acrylic type resin contained in the resin particles A include a poly (meth)acrylic acid, a poly (meth)acrylate, a poly (meth)acrylic acid ester, a crosslinked poly (meth)acrylic acid, a crosslinked poly (meth)acrylate, and a crosslinked poly (meth)acrylic acid ester, and also include a modified acrylic type resin. These resins may be used singly or in combination of two or more kinds thereof. The resin particles A may contain a resin other than an acrylic type resin.

The amount of an acrylic type resin contained in the resin particles A is more than 50% by mass, preferably 70% by mass or more, more preferably 90% by mass or more, and still more preferably 100% by mass with respect to the total solid content of the resin particles A.

In a case where a mixture of the resin particles F and the resin particles A is contained in the adhesive layer, a mass ratio between the resin particles F and the resin particles A contained in the adhesive layer only needs to be adjusted according to characteristics required for the adhesive layer. The mass ratio between the resin particles F and the resin particles A contained in the adhesive layer is preferably resin particles F:resin particles A=50:50 to 90:10.

The mixture of the resin particles F and the resin particles A is preferably a dispersion in which the resin particles F and the resin particles A are dispersed in a dispersion medium as a coating liquid used for producing the adhesive layer. The dispersion medium of the dispersion is not particularly limited as long as the dispersion medium does not dissolve a polyvinylidene fluoride type resin, an acrylic type resin, or the heat resistant porous layer, but is preferably water in terms of handling safety. That is, the dispersion is preferably an aqueous dispersion in which the resin particles F and the resin particles A are dispersed in water. A mass ratio between the resin particles F and the resin particles A contained in the aqueous dispersion is preferably resin particles F:resin particles A=50:50 to 90:10 when the resin particles F and the resin particles A are used for producing the adhesive layer.

Examples of a representative commercially available product of the aqueous dispersion in which the resin particles F and the resin particles A are dispersed in water include Aquatec FMA-12, Aquatec ARC, and Aquatec CRX manufactured by Arkema S.A.; and TRD202A manufactured by JSR Corporation.

The aqueous dispersion in which the resin particles F and the resin particles A are dispersed in water may be prepared by dispersing the resin particles F and the resin particles A in water, or may be prepared by mixing an aqueous dispersion in which the resin particles F are dispersed in water with an aqueous dispersion in which the resin particles A are dispersed in water.

As the aqueous dispersion in which the resin particles F are dispersed in water, a known aqueous dispersion including a commercially available product can be used, or the known resin particles F including a commercially available product can be dispersed in water and used. Examples of a representative commercially available product of the aqueous dispersion in which the resin particles F are dispersed in water include LBG2200LX, LATEX32, and KYNAR WATERBORNE RC series (RC-10246, RC-10278, and RC-10280) manufactured by Arkema S.A.; XPH838 series, XPH882 series, XPH883 series, XPH884 series, XPH859 series, and XPH918 series manufactured by Solvay Specialty Polymers; and PVDF aqueous dispersion manufactured by Kureha Corporation.

As the aqueous dispersion in which the resin particles A are dispersed in water, a known aqueous dispersion including a commercially available product can be used, or the known resin particles A including a commercially available product can be dispersed in water and used. Examples of a representative commercially available product of the aqueous dispersion in which the resin particles A are dispersed in water include BM-120S manufactured by Zeon Corporation; and an aqueous dispersion of acrylic particles manufactured by DIC Corporation.

The volume average particle diameter of the adhesive resin particles is preferably 0.01 μm or more, more preferably 0.03 μm or more, and still more preferably 0.05 μm or more from a viewpoint of forming a favorable porous structure, and is preferably 1.0 μm or less, more preferably 0.8 μm or less, and still more preferably 0.6 μm or less from a viewpoint of suppressing the thickness of the adhesive layer.

The adhesive layer may contain a component other than the adhesive resin particles as long as the effects of the present disclosure are not impaired. Examples of the component include an additive added to a resin particle dispersion for forming the adhesive layer. However, the adhesive layer preferably contains 90% by mass or more of the adhesive resin particles, and more preferably 95% by mass or more of the adhesive resin particles with respect to the total amount of the layer. More preferably, the adhesive layer contains substantially only the adhesive resin particles.

The adhesive layer in the separator of the present disclosure may contain an additive, for example, a dispersing agent such as a surfactant, a wetting agent, a defoamer, a pH adjusting agent or the like. The dispersing agent is added to the coating liquid for forming the adhesive layer, for the purpose of improving dispersibility, coatability and preservation stability. The wetting agent, defoamer and pH adjusting agent are added to the coating liquid for forming the adhesive layer, for example, for being well-mixed with the porous substrate, for suppressing air entrainment to the coating liquid, or for pH adjustment.

Examples of the surfactant contained in the resin particle dispersion for forming the adhesive layer include a non-reactive anionic surfactant such as alkyl sulfate, polyoxyethylene alkyl ether sulfate, alkylbenzene sulfonate, alkylnaphthalene sulfonate, alkyl sulfosuccinate, alkyl diphenyl ether disulfonate, naphthalene sulfonic acid formalin condensate, polyoxyethylene polycyclic phenyl ether sulfate, polyoxyethylene distyrenated phenyl ether sulfate, fatty acid salt, alkyl phosphate, or polyoxyethylene alkyl phenyl ether sulfate; a non-reactive nonionic surfactant such as polyoxyethylene alkyl ether, polyoxyalkylene alkyl ether, polyoxyethylene polycyclic phenyl ether, polyoxyethylene distyrenated phenyl ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene alkylamine, alkylalkanolamide, or polyoxyethylene alkylphenyl ether; and a so-called reactive surfactant in which an ethylenically unsaturated double bond is introduced into a chemical structure of a surfactant having a hydrophilic group and a lipophilic group.

Examples of an anionic surfactant that is a reactive surfactant include an ethylenically unsaturated monomer having a group selected from a sulfonic acid group, a sulfonate group, a sulfate group, or any salt thereof. The anionic surfactant that is a reactive surfactant is preferably a compound having a sulfonic acid group or a group which is an ammonium salt thereof or an alkali metal salt thereof (that is, an ammonium sulfonate group or an alkali metal sulfonate group). Specific examples thereof include alkyl allyl sulfosuccinate, polyoxyethylene alkylpropenyl phenyl ether sulfate, α-[1-[(allyloxy)methyl]-2-(nonylphenoxy)ethyl]-ω-polyoxyethylene sulfate, ammonium=α-sulfonato-ω-1-(allyloxymethyl)alkyloxypolyoxyethylene, styrene sulfonate, α-[2-[(allyloxy)-1-(alkyloxymethyl)ethyl]-ω-polyoxyethylene sulfate, and polyoxyethylene polyoxybutylene (3-methyl-3-butenyl) ether sulfate.

Examples of a nonionic surfactant that is a reactive surfactant include α-[1-[(allyloxy)methyl]-2-(nonylphenoxy)ethyl]-ω-hydroxypolyoxyethylene, polyoxyethylene alkylpropenyl phenyl ether, α-[2-[(allyloxy)-1-(alkyloxymethyl)ethyl]-ω-hydroxypolyoxyethylene, and polyoxyethylene polyoxybutylene (3-methyl-3-butenyl) ether.

The surfactants may be used singly or in combination of two or more kinds thereof.

In an example of the embodiment of the separator of the present disclosure, the adhesive layer further contains a surfactant. The surfactant contained in the adhesive layer is preferably at least one selected from the group consisting of a non-reactive anionic surfactant, a non-reactive nonionic surfactant, a reactive anionic surfactant, and a reactive nonionic surfactant. Specific examples of the non-reactive anionic surfactant, the non-reactive nonionic surfactant, the reactive anionic surfactant, and the reactive nonionic surfactant include specific examples described above as the surfactant contained in the resin particle dispersion for forming the adhesive layer. In a case where the adhesive layer further contains a surfactant, the mass ratio of the surfactant with respect to the total mass of the adhesive layer is preferably from 0.1% by mass to 10% by mass, and more preferably from 1% by mass to 8% by mass.

The weight of the adhesive layer per surface is preferably 0.2 $g/m^2$ or more, more preferably 0.25 $g/m^2$ or more, and still more preferably 0.3 $g/m^2$ or more from a viewpoint of adhesiveness to an electrode, and is preferably 2.0 $g/m^2$ or less, more preferably 1.8 $g/m^2$ or less, and still more preferably 1.6 $g/m^2$ or less from a viewpoint of ion permeability, handleability of the separator, or energy density of a battery.

The coverage of the adhesive resin particles in the adhesive layer (area ratio of the particles covering a plane) is preferably 60% or more, more preferably 70% or more, and still more preferably 80% or more with respect to the area of the separator in planar view. The coverage of the adhesive resin particles in the adhesive layer is determined by imaging a surface of the separator from a direction perpendicular to the surface with a scanning electron microscope, randomly specifying 10 square regions, determining the coverages of the regions, and calculating an average value of the coverages of the 10 square areas.

[Characteristics of Separator]

The separator of the present disclosure has a thickness of preferably 8.0 µm or more, more preferably 9.0 µm or more, from the viewpoint of mechanical strength of the separator, and preferably 20.0 µm or less, and more preferably 15.0 µm or less, from the viewpoint of energy density of a battery.

The piercing strength of the separator of the present disclosure is preferably from 150 g to 1,000 g, more preferably from 200 g to 600 g, from the viewpoint of mechanical strength of a separator or the short-circuit resistance of a battery. The measurement method of the piercing strength of the separator is identical to the measurement method of the piercing strength of the porous substrate.

It is preferred that the porosity of the separator of the present disclosure is from 30% to 60%, from the viewpoint of adhesiveness to the electrode, handleability of a separator, ion permeability, or mechanical strength.

The film resistance of the separator of the present disclosure is preferably from 0.5 ohm $cm^2$ to 10 ohm $cm^2$, and more preferably from 1 ohm $cm^2$ to 8 ohm $cm^2$, from the viewpoint of the load characteristics of the battery.

The Gurley value of the separator of the present disclosure (JIS P8117:2009) is preferably from 50 sec/100 ml to 800 sec/100 ml, more preferably from 80 sec/100 ml to 500 sec/100 ml, still more preferably from 100 sec/100 ml to 400 sec/100 ml, from the viewpoint of good balance between mechanical strength and ion permeability.

The separator of the present disclosure has the value obtained by subtracting the Gurley value of the porous substrate from the Gurley value of the separator (in a state that the heat resistant porous layer and the adhesive layer are formed on the porous substrate) is preferably 300 sec/100 ml or less, more preferably 200 sec/100 ml or less, and still more preferably 150 sec/100 ml or less, from the viewpoint of ion permeability. The lower limit of the value obtained by subtracting the Gurley value of the porous substrate from the Gurley value of the separator is preferably 20 sec/100 ml or more, from the viewpoint of providing adhesive resin particles in sufficient amount for adhering to the electrode.

The tensile strength of the separator of the present disclosure in the MD direction is preferably 500 kgf/$cm^2$ or more, more preferably 600 kgf/$cm^2$ or more, and still more preferably 700 kgf/$cm^2$ or more from a viewpoint of mechanical strength of the separator or handleability thereof (fixing property of the adhesive layer). A higher tensile strength in the MD direction is more preferable from the above viewpoint, but is usually 3000 kgf/$cm^2$ or less.

The tensile strength of the separator of the present disclosure in the TD direction is preferably 500 kgf/$cm^2$ or more, more preferably 600 kgf/$cm^2$ or more, and still more preferably 700 kgf/$cm^2$ or more from a viewpoint of mechanical strength of the separator or handleability thereof (fixing property of the adhesive layer). A higher tensile strength in the TD direction is more preferable from the above viewpoint, but is usually 3000 kgf/$cm^2$ or less.

The tensile strength of the separator of the present disclosure can be controlled by, for example, the content of inorganic particles in the heat resistant porous layer, the thickness of the heat resistant porous layer, the porosity of the heat resistant porous layer, and the thickness of the adhesive layer.

[Method of Producing Separator]

The first separator is produced by, for example, the following production method A or B. Production method B may be anyone of the following forms B-1 to B-4. In production methods A and B, the heat resistant porous layer is formed on the porous substrate by a wet coating method.

The second separator is produced by, for example, the following production method A or B. In production methods A and B, a method of forming the heat resistant porous layer may be a wet coating method or a dry coating method. Production method B may be any one of the following forms B-1 to B-7. Informs B-1 to B-4, the heat resistant porous layer is formed by the wet coating method. In forms B-5 to B-7, the heat resistant porous layer is formed by the dry coating method.

In the present disclosure, the wet coating method is a method of solidifying a coating layer in a coagulation liquid, and the dry coating method is a method of drying a coating layer to solidify the coating layer.

Production method A (non-continuous production method): A heat resistant porous layer is formed on a porous substrate fed from a roll to obtain a layered body composed of the porous substrate and the heat resistant porous layer, and then the layered body is once wound around another roll. Subsequently, an adhesive layer is formed on the layered body fed from the roll to obtain a separator, and the resulting separator is wound around another roll.

Production method B (continuous production method): A heat resistant porous layer and an adhesive layer are continuously or simultaneously formed on a porous substrate fed from a roll, and the resulting separator is wound around another roll.

Form B-1: A heat resistant porous layer-forming coating liquid is applied onto a porous substrate, and the resulting porous substrate is immersed in a coagulation liquid to solidify the coating layer, withdrawn from the coagulation liquid, washed with water, and dried. Subsequently, an adhesive resin particle dispersion is applied thereto and dried.

Form B-2: A heat resistant porous layer-forming coating liquid is applied onto a porous substrate, and the resulting porous substrate is immersed in a coagulation liquid to solidify the coating layer, withdrawn from the coagulation liquid, and washed with water. Subsequently, an adhesive resin particle dispersion is applied thereto and dried.

Form B-3: Two layers of a heat resistant porous layer-forming coating liquid and an adhesive resin particle dispersion are simultaneously applied onto a porous substrate, and the resulting porous substrate is immersed in a coagulation liquid to solidify the coating layer, withdrawn from the coagulation liquid, washed with water, and dried.

Form B-4: A heat resistant porous layer-forming coating liquid is applied onto a porous substrate, and the resulting porous substrate is immersed in a coagulation liquid to solidify the coating layer, withdrawn from the coagulation liquid, transported in a water bath containing adhesive resin particles to be washed with water and subjected to adhesion of the adhesive resin particles, withdrawn from the water bath, and dried.

Form B-5: A heat resistant porous layer-forming coating liquid is applied onto a porous substrate, and the resulting porous substrate is dried. Subsequently, an adhesive resin particle dispersion is applied thereto and dried.

Form B-6: A heat resistant porous layer-forming coating liquid is applied onto a porous substrate. Subsequently, an adhesive resin particle dispersion is applied thereto and dried.

Form B-7: Two layers of a heat resistant porous layer-forming coating liquid and an adhesive resin particle dispersion are simultaneously applied onto a porous substrate, and dried.

Hereinafter, steps included in the production method will be described in detail with reference to production method B of form B-1 as an example.

In production method B of form B-1, a heat resistant porous layer is formed on at least one surface of a porous substrate by a wet coating method to obtain a layered body composed of the porous substrate and the heat resistant porous layer, and subsequently an adhesive layer is formed on at least one surface of the layered body by a dry coating method. Production method B of form B-1 includes the following steps (1) to (7), and sequentially performs steps (1) to (7).

Step (1): Preparation of Heat Resistant Porous Layer-Forming Coating Liquid

In a case where the first separator is produced, a heat resistant porous layer-forming coating liquid (hereinafter, referred to as "coating liquid" in description of the production method) is prepared by dissolving at least one selected from the group consisting of a wholly aromatic polyamide, a polyamide imide, and a polyimide in a solvent. In the coating liquid, inorganic particles or another component are dispersed or dissolved, if necessary.

In a case where the second separator is produced, a heat resistant porous layer-forming coating liquid (hereinafter, referred to as "coating liquid" in description of the production method) is prepared by dissolving or dispersing a specific heat resistant resin and/or inorganic particles in a solvent. In the coating liquid, a resin other than the specific heat resistant resin or a component other than a resin is dissolved or dispersed, if necessary.

In a case where the first separator is produced, the solvent used for preparing the coating liquid contains a solvent that dissolves at least one selected from the group consisting of a wholly aromatic polyamide, a polyamide imide, and a polyimide (hereinafter, also referred to as "good solvent"). Examples of the good solvent include a polar amide solvent such as N-methylpyrrolidone, dimethylacetamide, dimethylformamide, or dimethylformamide.

In a case where the second separator is produced, the solvent used for preparing the coating liquid contains a solvent that dissolves the specific heat resistant resin and/or another resin (hereinafter, also referred to as "good solvent"). Examples of the good solvent include a polar amide solvent such as N-methylpyrrolidone, dimethylacetamide, dimethylformamide, or dimethylformamide.

The solvent used for preparing the coating liquid preferably contains a phase separation agent that induces phase separation from a viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and 40% by mass or less of the phase separation agent from a viewpoint of forming a favorable porous structure.

In a case where the first separator is produced, the resin concentration of a wholly aromatic polyamide, a polyamide imide, and a polyimide in the coating liquid is preferably from 1% by mass to 20% by mass from a viewpoint of forming a favorable porous structure.

In a case where the second separator is produced, the resin concentration of the coating liquid is preferably from 1% by mass to 20% by mass from a viewpoint of forming a favorable porous structure.

Step (2): Preparation of Adhesive Resin Particle Dispersion

The adhesive resin particle dispersion is prepared by dispersing adhesive resin particles in water. A surfactant may be added to the adhesive resin particle dispersion in order to enhance the dispersibility of the adhesive resin particles in water. The adhesive resin particle dispersion may be a commercially available product or a diluent of a commercially available product.

The concentration of the adhesive resin particles in the adhesive resin particle dispersion is preferably from 1% by mass to 60% by mass from a viewpoint of coating suitability.

Step (3): Coating of Coating Liquid

The coating liquid is applied to at least one surface of the porous substrate to form a coating layer on the porous substrate. Examples of a method of applying the coating liquid to the porous substrate include a knife coating method, a Meyer bar coating method, a die coating method, a reverse roll coating method, a roll coating method, a gravure coating method, a screen printing method, an ink jet method, and a spray method. In a case where the heat resistant porous layer is formed on both sides of the porous substrate, it is preferable to simultaneously apply the coating liquid to both sides of the porous substrate from a viewpoint of productivity.

Step (4): Solidification of Coating Layer

In a case where the first separator is produced, while the porous substrate having the coating layer formed thereon is immersed in a coagulation liquid to induce phase separation in the coating layer, at least one selected from the group consisting of a wholly aromatic polyamide, a polyamide imide, and a polyimide is solidified to form a porous coating film containing at least one selected from the group consisting of a wholly aromatic polyamide, a polyamide imide, and a polyimide. As a result, a layered body composed of the porous substrate and the heat resistant porous layer is obtained.

In a case where the second separator is produced, while the porous substrate having the coating layer formed thereon is immersed in a coagulation liquid to induce phase separation in the coating layer, the specific heat resistant resin and/or another resin is solidified to form a heat resistant porous layer. As a result, a layered body composed of the porous substrate and the heat resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

Step (5): Washing and Drying of Coating Layer

The layered body is withdrawn from the coagulation liquid and washed with water. By washing the layered body with water, the coagulation liquid is removed from the layered body. Furthermore, by drying the layered body, water is removed from the layered body. Washing is performed, for example, by transporting the layered body in a water washing bath. Drying is performed, for example, by transporting the layered body in a high-temperature environment, blowing air to the layered body, or bringing the layered body into contact with a heat roll. The drying temperature is preferably from 40° C. to 80° C.

Step (6): Coating of Adhesive Resin Particle Dispersion

The adhesive resin particle dispersion is applied to at least one side of the layered body. Examples of a method of applying the adhesive resin particle dispersion include a knife coating method, a gravure coating method, a Meyer bar coating method, a die coating method, a reverse roll coating method, a roll coating method, a screen printing method, an ink jet method, and a spray method.

Step (7): Drying of Adhesive Resin Particle Dispersion

The adhesive resin particle dispersion on the layered body is dried to cause the adhesive resin particles to adhere to a surface of the layered body. Drying is performed, for example, by transporting the layered body in a high-temperature environment, or by blowing air to the layered body. The drying temperature is preferably from 40° C. to 100° C.

Production method A for producing the first separator or production method B of forms B-2 to B-4 can be performed by partially omitting or changing the above steps (1) to (7).

Production method A for producing the second separator or production method B of forms B-2 to B-7 can be performed by partially omitting or changing the above steps (1) to (7).

<Non-Aqueous Secondary Battery>

The non-aqueous secondary battery according to the present disclosure is a non-aqueous secondary battery in which an electromotive force is obtained by doping and dedoping lithium. The non-aqueous secondary battery includes a positive electrode, a negative electrode, and the separator for a non-aqueous secondary battery according to the present disclosure. The term "dope" means occlusion, support, adsorption, or insertion, and means a phenomenon in which a lithium ion enters into an active material of an electrode such as a positive electrode or the like.

The non-aqueous secondary battery according to the present disclosure has a structure, for example, in which a battery element, in which a negative electrode and a positive electrode face each other via a separator, is impregnated with an electrolyte and is enclosed in an outer casing. The non-aqueous secondary battery according to the present disclosure is suitable for non-aqueous electrolyte secondary batteries and, in particular, for lithium ion secondary batteries.

The separator according to the present disclosure is excellent in adhesiveness to an electrode, so that the non-aqueous secondary battery according to the present disclosure exhibits excellent productivity of a battery and has excellent cycle characteristics (capacity retention rate) of a battery.

Hereinafter, aspect examples of the positive electrode, negative electrode, electrolyte solution, and outer casing included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer.

Examples of the conductive auxiliary agent include carbon materials such as acetylene black, KETJENBLACK (trade name of an electro-conductive carbon black distributed by Lion Specialty Chemicals Co., Ltd.), and graphite powder.

Examples of the current collector include an aluminum foil, a titanium foil, and a stainless steel foil, each having a thickness of from 5 μm to 20 μm.

In the non-aqueous secondary battery according to the present disclosure, when the adhesive layer of the separator according to the present disclosure includes a polyvinylidene fluoride type resin, since a polyvinylidene fluoride type resin has excellent oxidation resistance, when the adhesive layer is disposed at the positive electrode side of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum, wood's alloy, or the like. Examples of the binder resin include a polyvinylidene fluoride type resin and a styrene-butadiene copolymer. Examples of the conductive auxiliary agent include carbon materials such as acetylene black, KETJENBLACK (trade name of an electro-conductive carbon black distributed by Lion Specialty Chemicals Co., Ltd.), and graphite powder. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as y-butyrolactone and y-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the outer casing include a metal can and an aluminum laminated film pack. Examples of the shape of a battery include a square shape, a cylindrical shape, and a coin shape. The separator of the disclosure is suitable for any shape.

Examples of a method of producing the non-aqueous secondary battery of the present disclosure include a production method including impregnating a separator with an electrolytic solution and subjecting the separator to a heat press treatment (referred to as "wet heat press" in the present disclosure) to bond the separator to an electrode; and a production method including subjecting a separator to a heat press treatment without causing the separator to be impregnated with an electrolytic solution (referred to as "dry heat press" in the present disclosure) to bond the separator to an electrode.

The non-aqueous secondary battery of the present disclosure can be produced by disposing the separator of the present disclosure between a positive electrode and a negative electrode, winding the resulting product in a length direction to produce a wound body, and then performing, for example, the following production methods 1 to 3 using this wound body. The same applies to a case of using an element produced by a method of stacking at least one layer of a positive electrode, at least one layer of a separator, and at least one layer of a negative electrode in this order (a so-called stack method) instead of the wound body.

Production method 1: The wound body is dry-heat-pressed to bond the electrodes to the separator. Thereafter, the resulting product is housed in an exterior material (for example, an aluminum laminated film pack. The same applies hereinafter), and an electrolytic solution is injected therein. The wound body is further wet-heat-pressed from the outside of the exterior material to perform adhesion between the electrodes and the separator and sealing of the exterior material.

Production method 2: The wound body is housed in an exterior material, and an electrolytic solution is injected therein. The wound body is wet-heat-pressed from the outside of the exterior material to perform adhesion between the electrodes and the separator and sealing of the exterior material.

Production method 3: The wound body is dry-heat-pressed to bond the electrodes to the separator. Thereafter, the resulting product is housed in an exterior material, and an electrolytic solution is injected therein to perform sealing of the exterior material.

As conditions of the heat press in the above production methods 1 to 3, press temperature is preferably from 60° C. to 120° C., and more preferably from 70° C. to 100° C., and press pressure is preferably from 0.5 kg to 90 kg as a load per cm² of an electrode in each of dry heat press and wet heat press. Press time is preferably adjusted according to press temperature and press pressure, and is adjusted, for example, in a range of from 0.1 minutes to 60 minutes.

In the above production method 1 or 3, the wound body may be subjected to room temperature press (pressurization at normal temperature) before the dry heat press to temporarily bond the wound body. In the above production method 2, the wound body may be pressed at room temperature before the wound body is housed in the exterior material to temporarily bond the wound body.

EXAMPLES

Hereinafter, the separator and the non-aqueous secondary battery of the present disclosure will be described more specifically with reference to Examples. Materials, usage amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.

<Measurement Method and Evaluation Method>

The measurement methods and evaluation methods applied in the examples of the invention and comparative examples are as follows.

[Volume Average Particle Diameter of Inorganic Particles]

The inorganic particles were dispersed in water containing a nonionic surfactant (TRITON X-100), and particle size distribution of the filler was determined with a laser diffraction particle size distribution analyzer (MASTERSIZER 2000, manufactured by Sysmex Corporation). The particle diameter at 50% cumulative volume (D50) calculated from a smaller particle side in a volume particle size distribution was defined as the volume average particle diameter (μm) of the filler.

[Thicknesses of Porous Substrate and Separator]

Each of the thicknesses (m) of the porous substrate and the separator was determined by measuring thicknesses at 20 points with a contact-type thickness gauge (Mitutoyo Corporation, LITEMATIC VL-50) and averaging the measured values. As a measuring terminal, a cylindrical terminal having a diameter of 5 mm was used, and adjustment was performed such that a load of 0.01 N was applied during the measurement.

[Basis Weight]

A basis weight (mass per m², g/m²) was determined by cutting out a sample into a size of 10 cm×30 cm, measuring the mass thereof, and dividing the mass by the area thereof.

[Coating Amount of Each Layer]

The coating amount (g/m²) of each layer was determined by subtracting the basis weight (g/m²) before formation of a layer from the basis weight (g/m²) after formation of the layer.

[Gurley Value]

The Gurley value (sec/100 ml) of each of the porous substrate and the separator was measured with a Gurley type densometer (G-B2C manufactured by Toyo Seiki Seisaku-sho, Ltd.) in accordance with JIS P8117 (2009).

[Tensile Strength in MD Direction/TD Direction]

The separator was cut out into a size of 10 mm×100 mm, and the tensile strength thereof was measured using a tensile tester (A & D Company, Limited, RTC-1225A) under conditions of a load cell load of 5 kgf and a distance between chucks of 50 mm.

[Thermal Shrinkage Ratio]

A separator was cut into an 180 mm (MD direction)×60 mm (TD direction) test piece. The test piece was held by a clip at one end of the piece, and the test piece was suspended in an oven at 150° C. such that the MD direction of the test piece was the gravity direction to perform a heat treatment for 30 minutes under no tension. The lengths of the MD direction before and after the heat treatment were measured, and a thermal shrinkage ratio (%) was calculated from the following formula, and the thermal shrinkage ratios of three test pieces were averaged.

Thermal shrinkage ratio (%)={(length of MD direction before heat treatment−length of MD direction after heat treatment)/length of MD direction before heat treatment}×100

[Peel Strength Between Porous Substrate and Heat Resistant Porous Layer]

A T-shaped peel test was performed on the separator. Specifically, a pressure-sensitive adhesive tape (3M Company (Korea), product number: 550, width: 12 mm) was attached to one surface of the separator (when the pressure-sensitive adhesive tape was attached, the length direction of the pressure-sensitive adhesive tape was matched with the MD direction of the separator.), and the separator was cut out together with the pressure-sensitive adhesive tape into a size of 12 mm in the TD direction and 70 mm in the MD direction. The pressure-sensitive adhesive tape was slightly peeled off together with the adhesive layer and the heat resistant porous layer immediately below. Two separated ends were held by Tensilon (Orientec Co., Ltd., RTC-1210A), and a T-peel test was performed. Note that the pressure-sensitive adhesive tape was used as a support for peeling off the adhesive layer and the heat resistant porous layer from the porous substrate. The tensile speed of the T-peel test was 20 mm/min. A load (N) from 10 mm to 40 mm after start of measurement was sampled at 0.4 mm intervals. An average thereof was calculated and converted into a load per 10 mm width (N/10 mm). Furthermore, the loads of three test pieces were averaged, and this average value (N/10 mm) was multiplied by 100 to obtain peel strength (N/m).

[Adhesive Strength Between Electrode and Separator]

97 g of lithium cobaltate as a positive electrode active material, 1.5 g of acetylene black as a conductive auxiliary agent, 1.5 g of polyvinylidene fluoride as a binder, and an appropriate amount of N-methyl-pyrrolidone were mixed under stirring with a double-armed mixer to prepare a positive electrode slurry. This positive electrode slurry was applied to one surface of an aluminum foil having a thickness of 20 μm, dried and then pressed to obtain a positive electrode having a positive electrode active material layer (one-side coating).

The positive electrode obtained above was cut out into a size of 15 mm in width and 70 mm in length. The separator was cut out into a size of 18 mm in the TD direction and 75 mm in the MD direction. An aluminum foil having a thickness of 20 μm was cut out into a size of 15 mm in width and 70 mm in length. The positive electrode, the separator, and the aluminum foil were stacked in this order to prepare a layered body, and the layered body was housed in an aluminum laminated film pack. Next, the inside of the pack was evacuated using a vacuum sealer. The layered body was heat-pressed together with the pack using a heat press machine (temperature: 85° C., load: 1 MPa, press time: 15 seconds) to bond the positive electrode to the separator. Thereafter, the pack was opened, the layered body was taken out, and the aluminum foil was removed from the layered body to obtain a test piece.

The separator of the test piece was fixed to a lower chuck of Tensilon (A& D Company, STB-1225S). At this time, the separator was fixed to Tensilon such that the length direction of the test piece (that is, the MD direction of the separator) was matched with the direction of gravity. The positive electrode was peeled off from the separator by about 2 cm from a lower end. The end was fixed to an upper chuck, and a 180° peel test was performed. The tensile speed in the 180° peel test was 100 mm/min. A load (N) from 10 mm to 40 mm after start of measurement was sampled at 0.4 mm intervals. An average thereof was calculated. Furthermore, the loads of the three test pieces were averaged to obtain adhesive strength between the electrode and the separator (N/15 mm). In Table 2, the adhesive strength of a separator in Comparative Example A1 is defined as a reference value of 100, and the adhesive strength of each of separators in Examples and Comparative Example is illustrated in percentage. In Table 4, the adhesive strength of a separator in Comparative Example B1 is defined as a reference value of 100, and the adhesive strength of each of separators in Examples and Comparative Example is illustrated in percentage. In Table 6, the adhesive strength of a separator in Comparative Example C1 is defined as a reference value of 100, and the adhesive strength of each of separators in Examples and Comparative Example is illustrated in percentage. In Table 8, the adhesive strength of a separator in Comparative Example D1 is defined as a reference value of 100, and the adhesive strength of each of separators in Examples and Comparative Example is illustrated in percentage.

[Production Yield]

A positive electrode (one-side coating) was prepared in a similar manner to the preparation of the positive electrode in the above [Adhesive Strength Between Electrode and Separator].

300 g of artificial graphite as a negative electrode active material, 7.5 g of a water-soluble dispersion containing 40% by mass of a modified styrene-butadiene copolymer as a binder, 3 g of carboxymethylcellulose as a thickener, and an appropriate amount of water were mixed under stirring with a double-armed mixer to prepare a negative electrode slurry. This negative electrode slurry was applied to one side of a copper foil having a thickness of m, dried and then pressed to obtain a negative electrode having a negative electrode active material layer (one-side coating).

Two separators (width: 108 mm) were prepared and stacked on each other, and one end of the stacked separators in the MD direction was wound around a stainless steel core. The positive electrode with a lead tab welded (width: 106.5 mm) was sandwiched between the two separators, and the negative electrode with a lead tab welded (width: 107 mm) was disposed on one of the separators and wound to continuously produce 50 wound bodies. The obtained wound body was pressed at room temperature (load: 1 MPa, press time: 30 seconds), and subsequently heat-pressed (temperature: 85° C., load: 1 MPa, press time: 30 seconds) to obtain a flat battery element.

Immediately after the heat press and one hour after the heat press, the thickness of the flat battery element was measured. A case where a change in thickness was 3% or less was determined to be acceptable, and a case where a change in thickness was more than 3% was determined to be unacceptable. The number ratio (%) of acceptable battery elements was calculated and classified as follows.

A: The number ratio of acceptable battery elements is 100% (No battery element is unacceptable).

B: The number ratio of acceptable battery elements is 95% or more and less than 100% (one or two battery elements are unacceptable).

C: The number ratio of acceptable battery elements is 90% or more and less than 95% (3 to 5 battery elements are unacceptable).

D: The number ratio of acceptable battery elements is less than 90% (6 or more battery elements are unacceptable).

[Battery Swelling]

50 battery elements were produced in a similar manner to the above [Production Yield]. Each of the battery elements was housed in an aluminum laminated film pack, impregnated with an electrolytic solution, and sealed using a vacuum sealer. As the electrolytic solution, 1 mol/L LiPF 6-ethylene carbonate:ethyl methyl carbonate (mass ratio 3:7) was used. Thereafter, the aluminum laminated film packs containing the battery elements and the electrolytic solution were heat-pressed with a heat press machine (temperature: 85° C., load: 1 MPa, press time: 10 seconds) to obtain 50 secondary batteries for testing.

At a temperature of 25° C., the 50 secondary batteries for testing were charged and discharged for 100 cycles. Charging was performed at a constant current and a constant voltage of 0.7 C and 4.2 V, and discharging was performed at a constant current of 0.5 C and a cutoff of 2.75 V.

Before charging and discharging and after 100 cycles of charging and discharging, the thickness of each of the secondary batteries for testing was measured. A case where a change in thickness was 8% or less was determined to be acceptable, and a case where a change in thickness was more than 8% was determined to be unacceptable. The number ratio (%) of acceptable battery elements was calculated and classified as follows.

A: The number ratio of acceptable secondary batteries is 100% (No secondary battery is unacceptable).

B: The number ratio of acceptable secondary batteries is 95% or more and less than 100% (one or two secondary batteries are unacceptable).

C: The number ratio of acceptable secondary batteries is less than 95% (3 or more secondary batteries are unacceptable).

Preparation of First Separator: Form in which Heat Resistant Porous Layer has Porous Coating Film Containing Wholly Aromatic Polyamide Example A1

Meta-type aramid (polymetaphenylene isophthalamide, Teijin Limited, Conex) and magnesium hydroxide (Kyowa Chemical Industry Co. Ltd., Kisuma 5P, volume average particle diameter: 0.8 μm, BET specific surface area: 6.8 m$^2$/g) were mixed under stirring with a mixed solvent of dimethylacetamide (DMAc) and tripropylene glycol (TPG) (DMAc:TPG=80:20 [mass ratio]) such that a mass ratio therebetween was 20:80 and the concentration of meta-type aramid was 4% by mass to obtain coating liquid (A1).

A PVDF particle dispersion (solid content concentration: 7% by mass) in which polyvinylidene fluoride resin particles (melting point: 140° C., volume average particle diameter: 0.2 μm) were dispersed in water was prepared.

An appropriate amount of coating liquid (A1) was placed on a pair of Meyer bars. A polyethylene microporous film (thickness: 6 μm, porosity: 40%, Gurley value: 100 seconds/100 mL) was caused to pass between the Meyer bars, and coating liquid (A1) was applied to both sides thereof in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. Subsequently, the resulting film was caused to pass between a pair of bar coaters on which an appropriate amount of the PVDF particle dispersion was placed, and the PVDF particle dispersion was applied to both sides thereof in equal amounts, and dried. In this way, a separator having a heat resistant porous layer and an adhesive layer formed on both sides of the polyethylene microporous film was obtained.

Example A2

A separator was prepared in a similar manner to Example A1 except that the PVDF particle dispersion was changed to an acrylic resin particle dispersion (solid content concentration: 7% by mass) in which acrylic resin particles (glass transition temperature: 59° C., volume average particle diameter: 0.5 μm) were dispersed in water.

Example A3

A separator was prepared in a similar manner to Example A1 except that the meta-type aramid was changed to the following para-type aramid (polyparaphenylene terephthalamide).

In a flask, 4200 g of N-methyl-pyrrolidone (NMP) was put, and 272.65 g of calcium chloride dried at 200° C. for two hours was added thereto. The temperature thereof was raised to 100° C. Calcium chloride was completely dissolved. Thereafter, the temperature of the liquid was returned to room temperature, and 132.91 g of paraphenylenediamine was added thereto and was completely dissolved therein. While this solution was maintained at 20±2° C., 243.32 g of terephthalic acid dichloride was added to the solution in 10 portions about every five minutes. Subsequently, while the solution was maintained at 20±2° C., the solution was aged for one hour and stirred for 30 minutes under reduced pressure in order to remove bubbles. Subsequently, an NMP solution was gradually added to 100 g of this polymerization liquid, and the concentration of polyparaphenylene terephthalamide was adjusted to 2% by mass.

Examples A4 to A10

A separator was prepared in a similar manner to Example A1 except that the coating amount of the heat resistant porous layer or the adhesive layer was changed as illustrated in Table 1.

Examples A11 to A14

A separator was prepared in a similar manner to Example A1 except that the content of magnesium hydroxide was changed as illustrated in Table 1.

Example A15

A separator was prepared in a similar manner to Example A1 except that coating liquid (A1) was changed to the following coating liquid (A15), the temperature of the coagulation liquid was changed to 20° C., and the water temperature of the water washing tank was changed to 20° C.

Meta-type aramid (the same as that used in Example A1) and magnesium hydroxide (the same as that used in Example A1) were mixed under stirring with a mixed solvent of DMAc and TPG (DMAc:TPG=90:10 [mass ratio]) such that a mass ratio therebetween was 20:80, and the concentration of meta-type aramid was 5% by mass to obtain coating liquid (A15).

Example A16

A separator was prepared in a similar manner to Example A1 except that the polyethylene microporous film was changed to a multilayered microporous film (polypropylene layer/polyethylene layer/polypropylene layer, thickness: 12 μm, porosity: 44%, Gurley value: 242 seconds/100 mL).

Example A17

A separator was prepared in a similar manner to Example A1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 90:10.

Example A18

A separator was prepared in a similar manner to Example A1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30.

Example A19

A separator was prepared in a similar manner to Example A1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 50:50.

Comparative Example A1

A polyvinylidene fluoride type resin (vinylidene fluoride-hexafluoropropylene copolymer, weight average molecular weight: 1,130,000, hexafluoropropylene content: 5.4% by mass) was mixed under stirring with a mixed solvent of DMAc and TPG (DMAc:TPG=90:10 [mass ratio]) such that the concentration of the polyvinylidene fluoride type resin was 5% by mass to obtain an adhesive layer forming coating liquid.
In a similar manner to Example A1, coating liquid (A1) was applied to both sides of a polyethylene microporous film (the same as that used in Example A1) in equal amounts. The resulting film was immersed in a coagulation liquid to solidify the coating layers, washed, and dried. Subsequently, the resulting film was caused to pass between a pair of bar coaters on which an appropriate amount of adhesive layer forming coating liquid was placed, and the adhesive layer forming coating liquid was applied to both sides of the film in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. In this way, a separator having a heat resistant porous layer and an adhesive layer formed on both sides of the polyethylene microporous film was obtained.

Comparative Example A2

Alumina particles (Sumitomo Chemical Co., Ltd., AKP-3000, volume average particle diameter: 0.45 μm, tetrapod-like particles), carboxymethylcellulose (Daicel FineChem Ltd., D1200, degree of etherification: 0.8 to 1.0) as a viscosity modifier, an acrylic resin (DIC Corporation, DICNAL LSE-16AD4) as a binder resin, and a nonionic surfactant (San Nopco Limited, SN Wet 366) were mixed at a mass ratio of 94.6:3.8:1.4:0.2. Water was added to the resulting mixture to cause dispersion, thus preparing coating liquid (AC2) having a solid content concentration of 40% by mass.
An appropriate amount of coating liquid (AC2) was placed on a pair of Meyer bars. A polyethylene microporous film (the same as that used in Example A1) was caused to pass between the Meyer bars, and coating liquid (AC2) was applied to both sides thereof in equal amounts, and dried. Subsequently, the resulting film was caused to pass between a pair of bar coaters on which an appropriate amount of PVDF particle dispersion (the same as that used in Example A1) was placed, and the PVDF particle dispersion was applied to both sides thereof in equal amounts, and dried. In this way, a separator having a heat resistant porous layer and an adhesive layer formed on both sides of the polyethylene microporous film was obtained.

Comparative Example A3

A separator was prepared in a similar manner to Example A1 except that the solvent for preparing the coating liquid was changed to a mixed solvent of DMAc:TPG=60:40 [mass ratio].

Tables 1 and 2 illustrate the configurations, physical properties, and evaluation results of the separators in Examples A1 to A19 and Comparative Examples A1 to A3. In Table 1, PE, PP, aramid, PVDF, and PVDF-HFP represent a polyethylene, a polypropylene, a wholly aromatic polyamide, a polyvinylidene fluoride, and a vinylidene fluoride-hexafluoropropylene copolymer, respectively.

TABLE 1

| | Porous substrate | | Heat resistant porous layer | | | | | Adhesive layer | | | |
|---|---|---|---|---|---|---|---|---|---|---|---|
| | | | Heat resistant resin or Binder resin | Inorganic particle | | | | Coating amount (total amount on both sides) | Adhesive resin | | Coating amount (total amount on both sides) |
| | Material | Thickness [μm] | | Kind | Content ratio [% by mass] | Coating | Porous coating film | [g/m²] | Kind | Shape | Coating | [g/m²] |
| Example A1 | PE | 6 | Meta-type aramid | Mg(OH)$_2$ | 80 | Both sides | Present | 3.0 | PVDF | Particle | Both sides | 0.6 |
| Example A2 | PE | 6 | Meta-type aramid | Mg(OH)$_2$ | 80 | Both sides | Present | 3.0 | Acrylic resin | Particle | Both sides | 0.6 |
| Example A3 | PE | 6 | Para-type aramid | Mg(OH)$_2$ | 80 | Both sides | Present | 3.0 | PVDF | Particle | Both sides | 0.6 |
| Example A4 | PE | 6 | Meta-type | Mg(OH)$_2$ | 80 | Both | Present | 1.5 | PVDF | Particle | Both | 0.6 |

TABLE 1-continued

| | Porous substrate | | Heat resistant resin or Binder resin | Inorganic particle | | Porous coating film | Coating amount (total amount on both sides) [g/m²] | Adhesive layer | | | Coating amount (total amount on both sides) [g/m²] |
|---|---|---|---|---|---|---|---|---|---|---|---|
| | Material | Thickness [μm] | | Kind | Content ratio [% by mass] | Coating | | Adhesive resin Kind | Shape | Coating | |
| Example A5 | PE | 6 | Meta-type aramid | Mg(OH)₂ | 80 | Both sides | Present | 4.0 | PVDF | Particle | Both sides | 0.6 |
| Example A6 | PE | 6 | Meta-type aramid | Mg(OH)₂ | 80 | Both sides | Present | 3.0 | PVDF | Particle | Both sides | 0.3 |
| Example A7 | PE | 6 | Meta-type aramid | Mg(OH)₂ | 80 | Both sides | Present | 3.0 | PVDF | Particle | Both sides | 2.1 |
| Example A8 | PE | 6 | Meta-type aramid | Mg(OH)₂ | 80 | Both sides | Present | 3.0 | PVDF | Particle | Both sides | 3.0 |
| Example A9 | PE | 6 | Meta-type aramid | Mg(OH)₂ | 80 | Both sides | Present | 3.0 | PVDF | Particle | Both sides | 4.0 |
| Example A10 | PE | 6 | Meta-type aramid | Mg(OH)₂ | 80 | Both sides | Present | 3.0 | PVDF | Particle | Both sides | 5.0 |
| Example A11 | PE | 6 | Meta-type aramid | Mg(OH)₂ | 45 | Both sides | Present | 2.4 | PVDF | Particle | Both sides | 0.6 |
| Example A12 | PE | 6 | Meta-type aramid | Mg(OH)₂ | 60 | Both sides | Present | 2.7 | PVDF | Particle | Both sides | 0.6 |
| Example A13 | PE | 6 | Meta-type aramid | Mg(OH)₂ | 90 | Both sides | Present | 3.2 | PVDF | Particle | Both sides | 0.6 |
| Example A14 | PE | 6 | Meta-type aramid | — | 0 | Both sides | Present | 2.0 | PVDF | Particle | Both sides | 0.6 |
| Example A15 | PE | 6 | Meta-type aramid | Mg(OH)₂ | 80 | Both sides | Present | 3.0 | PVDF | Particle | Both sides | 0.6 |
| Example A16 | PP/PE/PP | 12 | Meta-type aramid | Mg(OH)₂ | 80 | Both sides | Present | 3.0 | PVDF | Particle | Both sides | 0.6 |
| Example A17 | PE | 6 | Meta-type aramid | Mg(OH)₂ | 80 | Both sides | Present | 3.0 | PVDF: Acrylic resin = 90:10 | Particle | Both sides | 0.6 |
| Example A18 | PE | 6 | Meta-type aramid | Mg(OH)₂ | 80 | Both sides | Present | 3.0 | PVDF: Acrylic resin = 70:30 | Particle | Both sides | 0.6 |
| Example A19 | PE | 6 | Meta-type aramid | Mg(OH)₂ | 80 | Both sides | Present | 3.0 | PVDF: Acrylic resin = 50:50 | Particle | Both sides | 0.6 |
| Comparative Example A1 | PE | 6 | Meta-type aramid | Mg(OH)₂ | 80 | Both sides | Present | 3.0 | PVDF-HFP | Non-particle | Both sides | 0.6 |
| Comparative Example A2 | PE | 6 | Acrylic resin | Alumina | 94.6 | Both sides | Absent | 3.0 | PVDF | Particle | Both sides | 0.6 |
| Comparative Example A3 | PE | 6 | Meta-type aramid | Mg(OH)₂ | 80 | Both sides | Absent | 3.0 | PVDF | Particle | Both sides | 0.6 |

TABLE 2

| | Separator | | | | | | | | Battery | |
|---|---|---|---|---|---|---|---|---|---|---|
| | Thickness [μm] | Basis weight [g/m²] | Gurley value [seconds/100 mL] | ΔGurley value [seconds/100 mL] | Tensile strength [kgf/cm²] MD direction | TD direction | Heat shrinkage [%] | Peel strength between substrate and heat resistant layer [N/m] | Adhesive strength to electrode [index] | Production yield | Battery swelling |
| Example A1 | 11 | 6.8 | 150 | 50 | 1598 | 893 | 22 | 27 | 409 | A | A |

TABLE 2-continued

| | | | | | Tensile strength [kgf/cm²] | | | Peel strength between substrate and | Adhesive strength to | Battery | |
|---|---|---|---|---|---|---|---|---|---|---|---|
| | | Basis | Gurley value | ΔGurley value | | | Heat | | | | |
| | Thickness [μm] | weight [g/m²] | [seconds/ 100 mL] | [seconds/ 100 mL] | MD direction | TD direction | shrinkage [%] | heat resistant [layer N/m] | electrode [index] | Production yield | Battery swelling |
| Example A2 | 11 | 6.8 | 160 | 60 | 1734 | 918 | 23 | 27 | 934 | A | A |
| Example A3 | 11 | 6.8 | 148 | 48 | 1633 | 926 | 21 | 27 | 388 | A | A |
| Example A4 | 9.5 | 5.3 | 120 | 20 | 1850 | 1034 | 30 | 43 | 370 | A | A |
| Example A5 | 12 | 7.8 | 165 | 65 | 1465 | 819 | 18 | 26 | 422 | A | A |
| Example A6 | 9 | 6.5 | 134 | 34 | 1953 | 1091 | 23 | 27 | 293 | C | B |
| Example A7 | 13 | 8.3 | 233 | 133 | 1352 | 756 | 22 | 27 | 1253 | A | A |
| Example A8 | 14 | 9.2 | 278 | 178 | 1256 | 702 | 22 | 27 | 1669 | A | A |
| Example A9 | 16 | 10.2 | 326 | 226 | 1099 | 614 | 22 | 27 | 2101 | A | A |
| Example A10 | 18 | 11.2 | 410 | 310 | 977 | 546 | 22 | 27 | 2156 | A | A |
| Example A11 | 10 | 6.2 | 180 | 80 | 1758 | 982 | 26 | 29 | 511 | A | A |
| Example A12 | 11 | 6.5 | 165 | 65 | 1609 | 903 | 25 | 28 | 441 | A | A |
| Example A13 | 12 | 7.0 | 140 | 40 | 1448 | 823 | 19 | 23 | 367 | A | A |
| Example A14 | 9 | 5.8 | 210 | 110 | 2002 | 1056 | 29 | 31 | 686 | A | A |
| Example A15 | 11 | 6.8 | 145 | 45 | 1741 | 915 | 21 | 39 | 483 | A | A |
| Example A16 | 17 | 10.2 | 343 | 101 | 1589 | 132 | 21 | 28 | 409 | A | A |
| Example A17 | 10 | 6.9 | 174 | 74 | 1772 | 980 | 22 | 28 | 531 | A | A |
| Example A18 | 10 | 7.0 | 175 | 75 | 1790 | 971 | 22 | 27 | 688 | A | A |
| Example A19 | 11 | 6.6 | 171 | 71 | 1783 | 988 | 23 | 27 | 697 | A | A |
| Comparative Example A1 | 11 | 6.8 | 185 | 85 | 1670 | 828 | 22 | 27 | 100 | D | C |
| Comparative Example A2 | 11 | 6.8 | 114 | 14 | 1706 | 943 | 15 | 4 | 38 | D | C |
| Comparative Example A3 | 12 | 6.8 | 127 | 27 | 1589 | 869 | 24 | 16 | 191 | C | C |

After a heat resistant porous layer was formed, a surface thereof was observed with a scanning electron microscope. In each of Examples Alto A19 and Comparative Example A1, a porous coating film was formed. In each of Examples A1 to A13 and A15 to A19 and Comparative Example A1, inorganic particles were bonded to each other and covered by the porous coating film. In Comparative Examples A2 and A3, inorganic particles were bonded to each other by a fibril-like resin, but a porous coating film was not formed.

Preparation of First Separator: Form in which Heat Resistant Porous Layer has Porous Coating Film Containing Polyamide Imide Example B1

Polyamide imide (Solvay S.A., Torlon4000TF) and magnesium hydroxide (Kyowa Chemical Industry Co. Ltd., Kisuma 5P, volume average particle diameter: 0.8 μm, BET specific surface area: 6.8 m²/g) were mixed under stirring with a mixed solvent of dimethylacetamide (DMAc) and tripropylene glycol (TPG) (DMAc:TPG=90:10 [mass ratio]) such that a mass ratio therebetween was 20:80 and the concentration of polyamide imide was 8% by mass to obtain coating liquid (B1).

A PVDF particle dispersion (solid content concentration: 7% by mass) in which polyvinylidene fluoride resin particles (melting point: 140° C., volume average particle diameter: 0.2 μm) were dispersed in water was prepared.

An appropriate amount of coating liquid (B1) was placed on a pair of Meyer bars. A polyethylene microporous film (thickness: 6 μm, porosity: 40%, Gurley value: 100 seconds/ 100 mL) was caused to pass between the Meyer bars, and coating liquid (B1) was applied to both sides thereof in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. Subsequently, the resulting film was caused to pass between a pair of bar coaters on which an appropriate amount of the PVDF particle dispersion was placed, and the PVDF particle dispersion was applied to both sides thereof in equal amounts, and dried. In this way, a separator having a heat resistant porous layer and an adhesive layer formed on both sides of the polyethylene microporous film was obtained.

Example B2

A separator was prepared in a similar manner to Example B1 except that the PVDF particle dispersion was changed to an acrylic resin particle dispersion (solid content concentration: 7% by mass) in which acrylic resin particles (glass transition temperature: 59° C., volume average particle diameter: 0.5 μm) were dispersed in water.

Example B3

A separator was prepared in a similar manner to Example B1 except that the polyamide imide (Solvay S.A., Torlon4000TF) was changed to a high-molecular-weight polyamide imide (Solvay S.A., Torlon4000T HV).

Examples B4 to B10

A separator was prepared in a similar manner to Example B1 except that the coating amount of the heat resistant porous layer or the adhesive layer was changed as illustrated in Table 3.

Examples B11 to B14

A separator was prepared in a similar manner to Example B1 except that the content of magnesium hydroxide was changed as illustrated in Table 3.

Example B15

A separator was prepared in a similar manner to Example B1 except that coating liquid (B1) was changed to the following coating liquid (B15), the temperature of the coagulation liquid was changed to 20° C., and the water temperature of the water washing tank was changed to 20° C.

Polyamide imide (the same as that used in Example B1) and magnesium hydroxide (the same as that used in Example B1) were mixed under stirring with DMAc such that a mass ratio therebetween was 20:80, and the concentration of polyamide imide was 9% by mass to obtain coating liquid (B15).

Example B16

A separator was prepared in a similar manner to Example B1 except that the polyethylene microporous film was changed to a multilayered microporous film (polypropylene layer/polyethylene layer/polypropylene layer, thickness: 12 μm, porosity: 44%, Gurley value: 242 seconds/100 mL).

Example B17

A separator was prepared in a similar manner to Example B1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 90:10.

Example B18

A separator was prepared in a similar manner to Example B1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30.

Example B19

A separator was prepared in a similar manner to Example B1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 50:50.

Comparative Example B1

A polyvinylidene fluoride type resin (vinylidene fluoride-hexafluoropropylene copolymer, weight average molecular weight: 1,130,000, hexafluoropropylene content: 5.4% by mass) was mixed under stirring with a mixed solvent of DMAc and TPG (DMAc:TPG=90:10 [mass ratio]) such that the concentration of the polyvinylidene fluoride type resin was 5% by mass to obtain an adhesive layer forming coating liquid.

In a similar manner to Example B1, coating liquid (B1) was applied to both sides of a polyethylene microporous film (the same as that used in Example B1) in equal amounts. The resulting film was immersed in a coagulation liquid to solidify the coating layers, washed, and dried. Subsequently, the resulting film was caused to pass between a pair of bar coaters on which an appropriate amount of adhesive layer forming coating liquid was placed, and the adhesive layer forming coating liquid was applied to both sides of the film in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. In this way, a separator having a heat resistant porous layer and an adhesive layer formed on both sides of the polyethylene microporous film was obtained.

Comparative Example B2

Alumina particles (Sumitomo Chemical Co., Ltd., AKP-3000, volume average particle diameter: 0.45 μm, tetrapod-like particles), carboxymethylcellulose (Daicel FineChem Ltd., D1200, degree of etherification: 0.8 to 1.0) as a viscosity modifier, an acrylic resin (DIC Corporation, DICNAL LSE-16AD4) as a binder resin, and a nonionic surfactant (San Nopco Limited, SN Wet 366) were mixed at a mass ratio of 94.6:3.8:1.4:0.2. Water was added the resulting mixture to cause dispersion, thus preparing coating liquid (BC2) having a solid content concentration of 40% by mass.

An appropriate amount of coating liquid (BC2) was placed on a pair of Meyer bars. A polyethylene microporous film (the same as that used in Example B1) was caused to pass between the Meyer bars, and coating liquid (BC2) was applied to both sides thereof in equal amounts, and dried. Subsequently, the resulting film was caused to pass between a pair of bar coaters on which an appropriate amount of PVDF particle dispersion (the same as that used in Example B1) was placed, and the PVDF particle dispersion was applied to both sides thereof in equal amounts, and dried. In this way, a separator having a heat resistant porous layer and an adhesive layer formed on both sides of the polyethylene microporous film was obtained.

Comparative Example B3

A separator was prepared in a similar manner to Example B1 except that the solvent for preparing the coating liquid was changed to a mixed solvent of DMAc:TPG=60:40 [mass ratio].

Tables 3 and 4 illustrate the configurations, physical properties, and evaluation results of the separators in Examples B1 to B19 and Comparative Examples B1 to B3. In Table 3, PE, PP, PAI, PVDF, and PVDF-HFP represent a polyethylene, a polypropylene, a polyamide imide, a polyvinylidene fluoride, and a vinylidene fluoride-hexafluoropropylene copolymer, respectively.

TABLE 3

| | Porous substrate | | Heat resistant resin or Binder resin | Inorganic particle | | Coating | Porous coating film | Coating amount (total amount on both sides) [g/m²] | Adhesive resin | | Coating | Coating amount (total amount on both sides) [g/m²] |
|---|---|---|---|---|---|---|---|---|---|---|---|---|
| | Material | Thickness [um] | | Kind | Content ratio [% by mass] | | | | Kind | Shape | | |
| Example B1 | PE | 6 | PAI | Mg(OH)₂ | 80 | Both sides | Present | 3.0 | PVDF | Particle | Both sides | 0.6 |
| Example B2 | PE | 6 | PAI | Mg(OH)₂ | 80 | Both sides | Present | 3.0 | Acrylic resin | Particle | Both sides | 0.6 |
| Example B3 | PE | 6 | High molecular weight PAI | Mg(OH)₂ | 80 | Both sides | Present | 3.0 | PVDF | Particle | Both sides | 0.6 |
| Example B4 | PE | 6 | PAI | Mg(OH)₂ | 80 | Both sides | Present | 1.5 | PVDF | Particle | Both sides | 0.6 |
| Example B5 | PE | 6 | PAI | Mg(OH)₂ | 80 | Both sides | Present | 4.0 | PVDF | Particle | Both sides | 0.6 |
| Example B6 | PE | 6 | PA1 | Mg(OH)₂ | 80 | Both sides | Present | 3.0 | PVDF | Particle | Both sides | 0.3 |
| Example B7 | PE | 6 | PAI | Mg(OH)₂ | 80 | Both sides | Present | 3.0 | PVDF | Particle | Both sides | 2.1 |
| Example B8 | PE | 6 | PAI | Mg(OH)₂ | 80 | Both sides | Present | 3.0 | PVDF | Particle | Both sides | 3.0 |
| Example B9 | PE | 6 | PAI | Mg(OH)₂ | 80 | Both sides | Present | 3.0 | PVDF | Particle | Both sides | 4.0 |
| Example B10 | PK: | 6 | PAI | Mg(OH)₂ | 80 | Both sides | Present | 3.0 | PVDF | Particle | Both sides | 5.0 |
| Example B11 | PE | 6 | PAI | Mg(OH)₂ | 45 | Both sides | Present | 2.4 | PVDF | Particle | Both sides | 0.6 |
| Example B12 | PE | 6 | PAI | Mg(OH)₂ | 60 | Both sides | Present | 2.7 | PVDF | Particle | Both sides | 0.6 |
| Example B13 | PE | 6 | PAI | Mg(OH)₂ | 90 | Both sides | Present | 3.2 | PVDF | Particle | Both sides | 0.6 |
| Example B14 | PE | 6 | PAI | — | 0 | Both sides | Present | 2.0 | PVDF | Particle | Both sides | 0.6 |
| Example B15 | PE | 6 | PAI | Mg(OH)₂ | 80 | Both sides | Present | 3.0 | PVDF | Particle | Both sides | 0.6 |
| Example B16 | PP/PE/PP | 12 | PAI | Mg(OH)₂ | 80 | Both sides | Present | 3.0 | PVDF | Particle | Both sides | 0.6 |
| Example B17 | PE | 6 | PAI | Mg(OH)₂ | 80 | Both sides | Present | 3.0 | PVDF: Acrylic resin = 90:10 | Particle | Both sides | 0.6 |
| Example B18 | PE | 6 | PAI | Mg(OH)₂ | 80 | Both sides | Present | 3.0 | PVDF: Acrylic resin = 70:30 | Particle | Both sides | 0.6 |
| Example B19 | PE | 6 | PAI | Mg(OH)₂ | 80 | Both sides | Present | 3.0 | PVDF: Acrylic resin = 50:50 | Particle | Both sides | 0.6 |
| Comparative Example B1 | PE | 6 | PAI | Mg(OH)₂ | 80 | Both sides | Present | 3.0 | PVDF-HFP | Non-particle | Both sides | 0.6 |
| Comparative Example B2 | PE | 6 | Acrylic resin | Alumina | 94.6 | Both sides | Absent | 3.0 | PVDF | Particle | Both sides | 0.6 |
| Comparative Example B3 | PE | 6 | PAI | Mg(OH)₂ | 80 | Both sides | Absent | 3.0 | PVDF | Particle | Both sides | 0.6 |

TABLE 4

| | | | | Tensile strength [kgf/cm²] | | | Peel strength between substrate and | Adhesive strength to | Battery | |
|---|---|---|---|---|---|---|---|---|---|---|
| | Thickness [μm] | Basis weight [g/m²] | Gurley value [seconds/ 100 mL] | ΔGurley value [seconds/ 100 mL] | MD direction | TD direction | Heat shrinkage [%] | heat resistant layer [N/m] | electrode [index] | Production yield | Battery swelling |
| Example B1 | 11 | 6.8 | 192 | 92 | 1687 | 904 | 23 | 16 | 389 | A | A |
| Example B2 | 11 | 6.8 | 199 | 99 | 1708 | 933 | 23 | 16 | 922 | A | A |
| Example B3 | 11 | 6.8 | 187 | 87 | 1641 | 917 | 21 | 16 | 400 | A | A |
| Example B4 | 9.5 | 5.3 | 162 | 62 | 1953 | 1047 | 29 | 32 | 405 | A | A |
| Example B5 | 12 | 7.8 | 211 | 111 | 1546 | 829 | 19 | 16 | 419 | A | A |
| Example B6 | 9 | 6.5 | 177 | 77 | 2062 | 1105 | 22 | 16 | 215 | C | B |
| Example B7 | 13 | 8.3 | 263 | 163 | 1427 | 765 | 22 | 16 | 1097 | A | A |
| Example B8 | 14 | 9.2 | 301 | 201 | 1326 | 710 | 22 | 16 | 1295 | A | A |
| Example B9 | 16 | 10.2 | 345 | 245 | 1160 | 622 | 21 | 16 | 1301 | A | A |
| Example B10 | 18 | 11.2 | 438 | 338 | 1031 | 552 | 22 | 16 | 1300 | A | A |
| Example B11 | 10 | 6.2 | 222 | 122 | 1856 | 994 | 26 | 17 | 453 | A | A |
| Example B12 | 11 | 6.5 | 201 | 101 | 1723 | 931 | 23 | 16 | 410 | A | A |
| Example B13 | 12 | 7.0 | 179 | 79 | 1518 | 832 | 19 | 15 | 377 | A | A |
| Example B14 | 9 | 5.8 | 246 | 146 | 2027 | 1083 | 27 | 18 | 532 | A | A |
| Example B15 | 11 | 6.8 | 183 | 83 | 1710 | 899 | 23 | 30 | 448 | A | A |
| Example B16 | 17 | 10.2 | 390 | 148 | 1552 | 147 | 21 | 18 | 416 | A | A |
| Example B17 | 10 | 6.9 | 216 | 116 | 1855 | 994 | 22 | 17 | 502 | A | A |
| Example B18 | 10 | 7.0 | 219 | 119 | 1840 | 941 | 22 | 16 | 699 | A | A |
| Example B19 | 11 | 6.6 | 206 | 106 | 1813 | 1003 | 23 | 16 | 737 | A | A |
| Comparative Example B1 | 11 | 6.8 | 225 | 125 | 1676 | 844 | 22 | 16 | 100 | D | C |
| Comparative Example B2 | 11 | 6.8 | 114 | 14 | 1706 | 943 | 15 | 4 | 59 | D | C |
| Comparative Example B3 | 12 | 6.8 | 169 | 69 | 1610 | 864 | 23 | 9 | 140 | D | C |

After a heat resistant porous layer was formed, a surface thereof was observed with a scanning electron microscope. In each of Examples B1 to B19 and Comparative Example B1, a porous coating film was formed. In each of Examples B1 to B13 and B15 to B19 and Comparative Example B1, inorganic particles were bonded to each other and covered by the porous coating film. In Comparative Examples B2 and B3, inorganic particles were bonded to each other by a fibril-like resin, but a porous coating film was not formed.

Preparation of First Separator: Form in which Heat Resistant Porous Layer has Porous Coating Film Containing Polyimide Example C1

Polyimide (PI R&D Co., Ltd., Q-VR-X1444) and magnesium hydroxide (Kyowa Chemical Industry Co. Ltd., Kisuma 5P, volume average particle diameter: 0.8 μm, BET specific surface area: 6.8 m²/g) were mixed under stirring with a mixed solvent of dimethylacetamide (DMAc) and tripropylene glycol (TPG) (DMAc:TPG=90:10 [mass ratio]) such that a mass ratio therebetween was 20:80 and the concentration of polyimide was 6% by mass to obtain coating liquid (C1).

A PVDF particle dispersion (solid content concentration: 7% by mass) in which polyvinylidene fluoride resin particles (melting point: 140° C., volume average particle diameter: 0.2 μm) were dispersed in water was prepared.

An appropriate amount of coating liquid (C1) was placed on a pair of Meyer bars. A polyethylene microporous film (thickness: 6 μm, porosity: 40%, Gurley value: 100 seconds/ 100 mL) was caused to pass between the Meyer bars, and coating liquid (C1) was applied to both sides thereof in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. Subsequently, the resulting film was caused to pass between a pair of bar coaters on which an appropriate amount of the PVDF particle dispersion was placed, and the PVDF particle dispersion was applied to both sides thereof in equal amounts, and dried. In this way, a separator having a heat resistant porous layer and an adhesive layer formed on both sides of the polyethylene microporous film was obtained.

Example C2

A separator was prepared in a similar manner to Example C1 except that the PVDF particle dispersion was changed to an acrylic resin particle dispersion (solid content concentration: 7% by mass) in which acrylic resin particles (glass transition temperature: 59° C., volume average particle diameter: 0.5 μm) were dispersed in water.

Examples C3 to C9

A separator was prepared in a similar manner to Example C1 except that the coating amount of the heat resistant porous layer or the adhesive layer was changed as illustrated in Table 5.

Examples C10 to C13

A separator was prepared in a similar manner to Example C1 except that the content of magnesium hydroxide was changed as illustrated in Table 5.

Example C14

A separator was prepared in a similar manner to Example C1 except that the concentration of polyimide was of coating liquid (C1) was changed to 8% by mass, the temperature of the coagulation liquid was changed to 20° C., and the water temperature of the water washing tank was changed to 20° C.

Example C15

A separator was prepared in a similar manner to Example C1 except that the polyethylene microporous film was changed to a multilayered microporous film (polypropylene layer/polyethylene layer/polypropylene layer, thickness: 12 μm, porosity: 44%, Gurley value: 242 seconds/100 mL).

Example C16

A separator was prepared in a similar manner to Example C1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 90:10.

Example C17

A separator was prepared in a similar manner to Example C1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30.

Example C18

A separator was prepared in a similar manner to Example C1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 50:50.

Comparative Example C1

A polyvinylidene fluoride type resin (vinylidene fluoride-hexafluoropropylene copolymer, weight average molecular weight: 1,130,000, hexafluoropropylene content: 5.4% by mass) was mixed under stirring with a mixed solvent of DMAc and TPG (DMAc:TPG=90:10 [mass ratio]) such that the concentration of the polyvinylidene fluoride type resin was 5% by mass to obtain an adhesive layer forming coating liquid.

In a similar manner to Example C1, coating liquid (C1) was applied to both sides of a polyethylene microporous film (the same as that used in Example C1) in equal amounts. The resulting film was immersed in a coagulation liquid to solidify the coating layers, washed, and dried. Subsequently, the resulting film was caused to pass between a pair of bar coaters on which an appropriate amount of adhesive layer forming coating liquid was placed, and the adhesive layer forming coating liquid was applied to both sides of the film in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. In this way, a separator having a heat resistant porous layer and an adhesive layer formed on both sides of the polyethylene microporous film was obtained.

Comparative Example C2

Alumina particles (Sumitomo Chemical Co., Ltd., AKP-3000, volume average particle diameter: 0.45 μm, tetrapod-like particles), carboxymethylcellulose (Daicel FineChem Ltd., D1200, degree of etherification: 0.8 to 1.0) as a viscosity modifier, an acrylic resin (DIC Corporation, DICNAL LSE-16AD4) as a binder resin, and a nonionic surfactant (San Nopco Limited, SN Wet 366) were mixed at a mass ratio of 94.6:3.8:1.4:0.2. Water was added the resulting mixture to cause dispersion, thus preparing coating liquid (CC2) having a solid content concentration of 40% by mass.

An appropriate amount of coating liquid (CC2) was placed on a pair of Meyer bars. A polyethylene microporous film (the same as that used in Example C1) was caused to pass between the Meyer bars, and coating liquid (CC2) was applied to both sides thereof in equal amounts, and dried. Subsequently, the resulting film was caused to pass between a pair of bar coaters on which an appropriate amount of PVDF particle dispersion (the same as that used in Example C1) was placed, and the PVDF particle dispersion was applied to both sides thereof in equal amounts, and dried. In this way, a separator having a heat resistant porous layer and an adhesive layer formed on both sides of the polyethylene microporous film was obtained.

Comparative Example C3

A separator was prepared in a similar manner to Example C1 except that the solvent for preparing the coating liquid was changed to a mixed solvent of DMAc:TPG=60:40 [mass ratio].

Tables 5 and 6 illustrate the configurations, physical properties, and evaluation results of the separators in Examples C1 to C18 and Comparative Examples C1 to C3. In Table 5, PE, PP, PI, PVDF, and PVDF-HFP represent a polyethylene, a polypropylene, a polyimide, a polyvinylidene fluoride, and a vinylidene fluoride-hexafluoropropylene copolymer, respectively.

TABLE 5

| | Porous substrate | | Heat resistant porous layer | | | | | Adhesive layer | | | |
|---|---|---|---|---|---|---|---|---|---|---|---|
| | | | Heat resistant resin or Binder resin | Inorganic particle | | | Coating amount (total amount on both sides) [g/m²] | Adhesive resin | | | Coating amount (total amount on both sides) [g/m²] |
| | Material | Thickness [μm] | | Kind | Content ratio [% by mass] | Coating | Porous coating film | | Kind | Shape | Coating | |
| Example C1 | PE | 6 | PI | Mg(OH)₂ | 80 | Both sides | Present | 3.0 | PVDF | Particle | Both sides | 0.6 |
| Example C2 | PE | 6 | PI | Mg(OH)₂ | 80 | Both sides | Present | 3.0 | Acrylic resin | Particle | Both sides | 0.6 |
| Example C3 | PE | 6 | PI | Mg(OH)₂ | 80 | Both sides | Present | 1.5 | PVDF | Particle | Both sides | 0.6 |
| Example C4 | PE | 6 | PI | Mg(OH)₂ | 80 | Both sides | Present | 4.0 | PVDF | Particle | Both sides | 0.6 |
| Example C5 | PE | 6 | PI | Mg(OH)₂ | 80 | Both sides | Present | 3.0 | PVDF | Particle | Both sides | 0.3 |
| Example C6 | PE | 6 | PI | Mg(OH)₂ | 80 | Both sides | Present | 3.0 | PVDF | Particle | Both sides | 2.1 |
| Example C7 | PE | 6 | PI | Mg(OH)₂ | 80 | Both sides | Present | 3.0 | PVDF | Particle | Both sides | 3.0 |
| Example C8 | PE | 6 | PI | Mg(OH)₂ | 80 | Both sides | Present | 3.0 | PVDF | Particle | Both sides | 4.0 |
| Example C9 | PE | 6 | PI | Mg(OH)₂ | 80 | Both sides | Present | 3.0 | PVDF | Particle | Both sides | 5.0 |
| Example C10 | PE | 6 | PI | Mg(OH)₂ | 45 | Both sides | Present | 2.4 | PVDF | Particle | Both sides | 0.6 |
| Example C11 | PE | 6 | PI | Mg(OH)₂ | 60 | Both sides | Present | 2.7 | PVDF | Particle | Both sides | 0.6 |
| Example C12 | PE | 6 | PI | Mg(OH)₂ | 90 | Both sides | Present | 3.2 | PVDF | Particle | Both sides | 0.6 |
| Example C13 | PE | 6 | PI | — | 0 | Both sides | Present | 2.0 | PVDF | Particle | Both sides | 0.6 |
| Example C14 | PE | 6 | PI | Mg(OH)₂ | 80 | Both sides | Present | 3.0 | PVDF | Particle | Both sides | 0.6 |
| Example C15 | PP/PE/PP | 12 | PI | Mg(OH)₂ | 80 | Both sides | Present | 3.0 | PVDF | Particle | Both sides | 0.6 |
| Example C16 | PE | 6 | PI | Mg(OH)₂ | 80 | Both sides | Present | 3.0 | PVDF: Acrylic resin = 90:10 | Particle | Both sides | 0.6 |
| Example C17 | PE | 6 | PI | Mg(OH)₂ | 80 | Both sides | Present | 3.0 | PVDF: Acrylic resin = 70:30 | Particle | Both sides | 0.6 |
| Example C18 | PE | 6 | PI | Mg(OH)₂ | 80 | Both sides | Present | 3.0 | PVDF: Acrylic resin = 50:50 | Particle | Both sides | 0.6 |
| Comparative Example C1 | PE | 6 | PI | Mg(OH)₂ | 80 | Both sides | Present | 3.0 | PVDF-HFP | Non-particle | Both sides | 0.6 |
| Comparative Example C2 | PE | 6 | Acrylic resin | Alumina | 94.6 | Both sides | Absent | 3.0 | PVDF | Particle | Both sides | 0.6 |
| Comparative Example C3 | PE | 6 | PI | Mg(OH)₂ | 80 | Both sides | Absent | 3.0 | PVDF | Particle | Both sides | 0.6 |

TABLE 6

| | Separator | | | | | | | | Battery | |
|---|---|---|---|---|---|---|---|---|---|---|
| | Thickness [μm] | Basis weight [g/m²] | Gurley value [seconds/100 mL] | ΔGurley value [seconds/100 mL] | Tensile strength [kgf/cm²] | | Heat shrinkage [%] | Peel strength between substrate and heat resistant layer [N/m] | Adhesive strength to electrode [index] | Production yield | Battery swelling |
| | | | | | MD direction | TD direction | | | | | |
| Example C1 | 11 | 6.8 | 197 | 97 | 1668 | 920 | 21 | 15 | 407 | A | A |
| Example C2 | 11 | 6.8 | 213 | 113 | 1689 | 935 | 22 | 15 | 945 | A | A |
| Example C3 | 9.5 | 5.3 | 159 | 59 | 1931 | 1065 | 29 | 30 | 363 | A | A |
| Example C4 | 12 | 7.8 | 232 | 132 | 1538 | 837 | 16 | 15 | 408 | A | A |
| Example C5 | 9 | 6.5 | 182 | 82 | 2039 | 1124 | 21 | 15 | 195 | C | B |
| Example C6 | 13 | 8.3 | 278 | 178 | 1411 | 778 | 22 | 15 | 1140 | A | A |
| Example C7 | 14 | 9.2 | 310 | 210 | 1311 | 723 | 21 | 15 | 1257 | A | A |
| Example C8 | 16 | 10.2 | 367 | 267 | 1147 | 633 | 22 | 15 | 1292 | A | A |
| Example C9 | 18 | 11.2 | 441 | 341 | 1019 | 562 | 21 | 15 | 1278 | A | A |

TABLE 6-continued

| | Separator | | | | | | | | Battery | |
|---|---|---|---|---|---|---|---|---|---|---|
| | Thickness [μm] | Basis weight [g/m²] | Gurley value [seconds/ 100 mL] | ΔGurley value [seconds/ 100 mL] | Tensile strength [kgf/cm²] MD direction | Tensile strength [kgf/cm²] TD direction | Heat shrinkage [%] | Peel strength between substrate and heat resistant layer [N/m] | Adhesive strength to electrode [index] | Production yield | Battery swelling |
| Example C10 | 10 | 6.2 | 237 | 137 | 1835 | 1012 | 24 | 17 | 471 | A | A |
| Example C11 | 11 | 6.5 | 219 | 119 | 1674 | 952 | 23 | 16 | 425 | A | A |
| Example C12 | 12 | 7.0 | 184 | 84 | 1529 | 843 | 18 | 9 | 386 | A | A |
| Example C13 | 9 | 5.8 | 245 | 145 | 2047 | 1152 | 28 | 19 | 547 | A | A |
| Example C14 | 11 | 6.8 | 196 | 96 | 1741 | 915 | 20 | 22 | 449 | A | A |
| Example C15 | 17 | 10.2 | 398 | 156 | 1589 | 132 | 20 | 19 | 403 | A | A |
| Example C16 | 10 | 6.9 | 217 | 117 | 1788 | 1012 | 22 | 16 | 533 | A | A |
| Example C17 | 10 | 7.0 | 221 | 121 | 1817 | 987 | 22 | 15 | 676 | A | A |
| Example C18 | 10 | 6.6 | 205 | 105 | 1779 | 1043 | 21 | 15 | 642 | A | A |
| Comparative Example C1 | 11 | 6.8 | 239 | 139 | 1681 | 823 | 20 | 16 | 100 | D | C |
| Comparative Example C2 | 11 | 6.8 | 114 | 14 | 1706 | 943 | 15 | 4 | 48 | D | C |
| Comparative Example C3 | 12 | 6.8 | 186 | 86 | 1555 | 849 | 23 | 9 | 149 | D | C |

After a heat resistant porous layer was formed, a surface thereof was observed with a scanning electron microscope. In Examples C1 to C18 and Comparative Example C1, a porous coating film was formed. In Examples C1 to C12 and C14 to C18, and Comparative Example C1, inorganic particles were bonded to each other and covered by the porous coating film. In Comparative Examples C2 and C3, inorganic particles were bonded to each other by a fibril-like resin, but a porous coating film was not formed.

Preparation of Second Separator

Example D1

Meta-type aramid (polymetaphenylene isophthalamide, Teijin Limited, Conex) and magnesium hydroxide (Kyowa Chemical Industry Co. Ltd., Kisuma 5P, volume average particle diameter: 0.8 μm, BET specific surface area: 6.8 m²/g) were mixed under stirring with a mixed solvent of dimethylacetamide (DMAc) and tripropylene glycol (TPG) (DMAc:TPG=80:20 [mass ratio]) such that a mass ratio therebetween was 20:80 and the concentration of meta-type aramid was 4% by mass to obtain coating liquid (D1).

A PVDF particle dispersion (solid content concentration: 7% by mass) in which polyvinylidene fluoride resin particles (melting point: 140° C., volume average particle diameter: 0.2 μm) were dispersed in water was prepared.

An appropriate amount of coating liquid (D1) was placed on a pair of Meyer bars. A polyethylene microporous film (thickness: 6 μm, porosity: 40%, Gurley value: 100 seconds/ 100 mL) was caused to pass between the Meyer bars, and coating liquid (D1) was applied to both sides thereof in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. Subsequently, the resulting film was caused to pass between a pair of bar coaters on which an appropriate amount of the PVDF particle dispersion was placed, and the PVDF particle dispersion was applied to both sides thereof in equal amounts, and dried. In this way, a separator having a heat resistant porous layer and an adhesive layer formed on both sides of the polyethylene microporous film was obtained.

Example D2

A separator was prepared in a similar manner to Example D1 except that the PVDF particle dispersion was changed to an acrylic resin particle dispersion (solid content concentration: 7% by mass) in which acrylic resin particles (glass transition temperature: 59° C., volume average particle diameter: 0.5 μm) were dispersed in water.

Example D3

A separator was prepared in a similar manner to Example D1 except that the meta-type aramid was changed to the following para-type aramid (polyparaphenylene terephthalamide).

In a flask, 4200 g of N-methyl-pyrrolidone (NMP) was put, and 272.65 g of calcium chloride dried at 200° C. for two hours was added thereto. The temperature thereof was raised to 100° C. Calcium chloride was completely dissolved. Thereafter, the temperature of the liquid was returned to room temperature, and 132.91 g of paraphenylenediamine was added thereto and was completely dissolved therein. While this solution was maintained at 20±2° C., 243.32 g of terephthalic acid dichloride was added to the solution in 10 portions about every five minutes. Subsequently, while the solution was maintained at 20±2° C., the solution was aged for one hour and stirred for 30 minutes under reduced pressure in order to remove bubbles. Subsequently, an NMP solution was gradually added to 100 g of this polymerization liquid, and the concentration of polyparaphenylene terephthalamide was adjusted to 2% by mass.

Example D4

A separator was prepared in a similar manner to Example D1 except that the meta-type aramid was changed to a polyetherimide (SABIC, Ultem).

Examples D5 to D11

A separator was prepared in a similar manner to Example D1 except that the coating amount of the heat resistant porous layer or the adhesive layer was changed as illustrated in Table 7.

Examples D12 to D15

A separator was prepared in a similar manner to Example D1 except that the content of magnesium hydroxide was changed as illustrated in Table 7.

Example D16

A separator was prepared in a similar manner to Example D1 except that coating liquid (D1) was changed to the following coating liquid (D16), the temperature of the coagulation liquid was changed to 20° C., and the water temperature of the water washing tank was changed to 20° C.

Meta-type aramid (the same as that used in Example D1) and magnesium hydroxide (the same as that used in Example D1) were mixed under stirring with a mixed solvent of DMAc and TPG (DMAc:TPG=90:10 [mass ratio]) such that a mass ratio therebetween was 20:80, and the concentration of meta-type aramid was 5% by mass to obtain coating liquid (D16).

Example D17

Alumina particles (Sumitomo Chemical Co., Ltd., AKP-3000, volume average particle diameter: 0.45 μm, tetrapod-like particles), carboxymethylcellulose (Daicel FineChem Ltd., D1200, degree of etherification: 0.8 to 1.0) as a viscosity modifier, an acrylic resin (DIC Corporation, DICNAL LSE-16AD4) as a binder resin, and a nonionic surfactant (San Nopco Limited, SN Wet 366) were mixed at a mass ratio of 85:3.8:11:0.2. Water was added the resulting mixture to cause dispersion, thus preparing coating liquid (D17) having a solid content concentration of 40% by mass.

An appropriate amount of coating liquid (D17) was placed on a pair of Meyer bars. A polyethylene microporous film (the same as that used in Example D1) was caused to pass between the Meyer bars, and coating liquid (D17) was applied to both sides thereof in equal amounts, and dried. Subsequently, the resulting film was caused to pass between a pair of bar coaters on which an appropriate amount of the PVDF particle dispersion (the same as that used in Example D1) was placed, and the PVDF particle dispersion was applied to both sides thereof in equal amounts, and dried. In this way, a separator having a heat resistant porous layer and an adhesive layer formed on both sides of the polyethylene microporous film was obtained.

Example D18

A separator was prepared in a similar manner to Example D1 except that the polyethylene microporous film was changed to a multilayered microporous film (polypropylene layer/polyethylene layer/polypropylene layer, thickness: 12 μm, porosity: 44%, Gurley value: 242 seconds/100 mL).

Example D19

A separator was prepared in a similar manner to Example D1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 90:10.

Example D20

A separator was prepared in a similar manner to Example D1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30.

Example D21

A separator was prepared in a similar manner to Example D1 except that the PVDF particle dispersion was changed to an aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 50:50.

Comparative Example D1

A polyvinylidene fluoride type resin (vinylidene fluoride-hexafluoropropylene copolymer, weight average molecular weight: 1,130,000, hexafluoropropylene content: 5.4% by mass) was mixed under stirring with a mixed solvent of DMAc and TPG (DMAc:TPG=90:10 [mass ratio]) such that the concentration of the polyvinylidene fluoride type resin was 5% by mass to obtain an adhesive layer forming coating liquid.

In a similar manner to Example D1, coating liquid (D1) was applied to both sides of a polyethylene microporous film (the same as that used in Example D1) in equal amounts. The resulting film was immersed in a coagulation liquid to solidify the coating layers, washed, and dried. Subsequently, the resulting film was caused to pass between a pair of bar coaters on which an appropriate amount of adhesive layer forming coating liquid was placed, and the adhesive layer forming coating liquid was applied to both sides of the film in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. In this way, a separator having a heat resistant porous layer and an adhesive layer formed on both sides of the polyethylene microporous film was obtained.

Comparative Example D2

A separator was prepared in a similar manner to Comparative Example D1 except that the meta-type aramid was changed to the polyetherimide used in Example D4.

Comparative Example D3

Coating liquid (D17) prepared in Example D17 and the adhesive layer forming coating liquid prepared in Comparative Example D1 were prepared.

An appropriate amount of coating liquid (D17) was placed on a pair of Meyer bars. A polyethylene microporous film (the same as that used in Example D1) was caused to pass between the Meyer bars, and coating liquid (D17) was applied to both sides thereof in equal amounts, and dried. Subsequently, the resulting film was caused to pass between a pair of bar coaters on which an appropriate amount of adhesive layer forming coating liquid was placed, and the adhesive layer forming coating liquid was applied to both sides of the film in equal amounts. The resulting film was immersed in a coagulation liquid (DMAc:TPG:water=30:8:62 [mass ratio], liquid temperature: 40° C.) to solidify the coating layers, subsequently washed in a water washing tank at a water temperature of 40° C., and dried. In this way, a separator having a heat resistant porous layer and an adhesive layer formed on both sides of the polyethylene microporous film was obtained.

Comparative Example D4

Alumina particles (Sumitomo Chemical Co., Ltd., AKP-3000, volume average particle diameter: 0.45 μm, tetrapod-like particles), carboxymethylcellulose (Daicel FineChem Ltd., D1200, degree of etherification: 0.8 to 1.0) as a viscosity modifier, an acrylic resin (DIC Corporation, DICNAL LSE-16AD4) as a binder resin, and a nonionic surfactant (San Nopco Limited, SN Wet 366) were mixed at a mass ratio of 94.6:3.8:1.4:0.2. Water was added the resulting mixture to cause dispersion, thus preparing coating liquid (DC4) having a solid content concentration of 40% by mass.

An appropriate amount of coating liquid (DC4) was placed on a pair of Meyer bars. A polyethylene microporous film (the same as that used in Example D1) was caused to pass between the Meyer bars, and coating liquid (DC4) was applied to both sides thereof in equal amounts, and dried. Subsequently, the resulting film was caused to pass between a pair of bar coaters on which an appropriate amount of the PVDF particle dispersion (the same as that used in Example D1) was placed, and the PVDF particle dispersion was applied to both sides thereof in equal amounts, and dried. In this way, a separator having a heat resistant porous layer and an adhesive layer formed on both sides of the polyethylene microporous film was obtained.

Tables 7 and 8 illustrate the configurations, physical properties, and evaluation results of the separators in Examples D1 to D21 and Comparative Examples D1 to D4. In Table 7, PE, PP, aramid, PVDF, and PVDF-HFP represent a polyethylene, a polypropylene, a wholly aromatic polyamide, a polyvinylidene fluoride, and a vinylidene fluoride-hexafluoropropylene copolymer, respectively.

TABLE 7

| | Porous substrate | | Heat resistant porous layer | | | | | | Adhesive layer | | | |
|---|---|---|---|---|---|---|---|---|---|---|---|---|
| | | | Heat resistant resin or Binder resin | Inorganic particle | | | Coating | Coating amount (total amount on both sides) [g/m²] | | | | Coating amount (total amount on both sides) [g/m²] |
| | Material | Thickness [μm] | | Kind | Content Ratio [% by mass] | Porous Coating | film | | Adhesive resin | | Coating | |
| | | | | | | | | | Kind | Shape | | |
| Example D1 | PE | 6 | Meta-type aramid | Mg(OH)₂ | 80 | Both sides | Present | 3.0 | PVDF | Particle | Both sides | 0.6 |
| Example D2 | PE | 6 | Meta-type aramid | Mg(OH)₂ | 80 | Both sides | Present | 3.0 | Acrylic resin | Particle | Both sides | 0.6 |
| Example D3 | PE | 6 | Para-type aramid | Mg(OH)₂ | 80 | Both sides | Present | 3.0 | PVDF | Particle | Both sides | 0.6 |
| Example D4 | PE | 6 | Polyetherimide | Mg(OH)₂ | 80 | Both sides | Present | 3.0 | PVDF | Particle | Both sides | 0.6 |
| Example D5 | PE | 6 | Meta-type aramid | Mg(OH)₂ | 80 | Both sides | Present | 1.5 | PVDF | Particle | Both sides | 0.6 |
| Example D6 | PE | 6 | Meta-type aramid | Mg(OH)₂ | 80 | Both sides | Present | 4.0 | PVDF | Particle | Both sides | 0.6 |
| Example D7 | PE | 6 | Meta-type aramid | Mg(OH)₂ | 80 | Both sides | Present | 3.0 | PVDF | Particle | Both sides | 0.3 |
| Example D8 | PE | 6 | Meta-type aramid | Mg(OH)₂ | 80 | Both sides | Present | 3 0 | PVDF | Particle | Both sides | 2 1 |
| Example D9 | PE | 6 | Meta-type aramid | Mg(OH)₂ | 80 | Both sides | Present | 3.0 | PVDF | Particle | Both sides | 3.0 |
| Example D10 | PE | 6 | Meta-type aramid | Mg(OH)₂ | 80 | Both sides | Present | 3.0 | PVDF | Particle | Both sides | 4.0 |
| Example D11 | PE | 6 | Meta-type aramid | Mg(OH)₂ | 80 | Both sides | Present | 3.0 | PVDF | Particle | Both sides | 5.0 |
| Example D12 | PE | 6 | Meta-type aramid | Mg(OH)₂ | 45 | Both sides | Present | 2.4 | PVDF | Particle | Both sides | 0.6 |
| Example D13 | PE | 6 | Meta-type aramid | Mg(OH)₂ | 60 | Both sides | Present | 2.7 | PVDF | Particle | Both sides | 0.6 |
| Example D14 | PE | 6 | Meta-type aramid | Mg(OH)₂ | 90 | Both sides | Present | 3.2 | PVDF | Particle | Both sides | 0.6 |
| Example D15 | PF | 6 | Meta-type aramid | — | 0 | Both sides | Present | 2.0 | PVDF | Particle | Both sides | 0.6 |
| Example D16 | PE | 6 | Meta-type aramid | Mg(OH)₂ | 80 | Both sides | Present | 3.0 | PVDF | Particle | Both sides | 0.6 |
| Example D17 | PE | 6 | Acrylic resin | Alumina | 85 | Both sides | Absent | 3.0 | PVDF | Particle | Both sides | 0.6 |
| Example D18 | PP/PE/PP | 12 | Meta-type aramid | Mg(OH)₂ | 80 | Both sides | Present | 3.0 | PVDF | Particle | Both sides | 0.6 |

TABLE 7-continued

| | Porous substrate | | Heat resistant porous layer | | | | | Adhesive layer | | | |
|---|---|---|---|---|---|---|---|---|---|---|---|
| | | | Heat resistant resin or Binder resin | Inorganic particle | | | Porous coating film | Coating amount (total amount on both sides) [g/m²] | Adhesive resin | | Coating amount (total amount on both sides) [g/m²] |
| | Material | Thickness [μm] | | Kind | Content Ratio [% by mass] | Coating | | | Kind | Shape | Coating |
| Example D19 | PE | 6 | Meta-type aramid | Mg(OH)₂ | 80 | Both sides | Present | 3.0 | PVDF: Acrylic resin = 90:10 | Particle | Both sides | 0.6 |
| Example D20 | PE | 6 | Meta-type aramid | Mg(OH)₂ | 80 | Both sides | Present | 3.0 | PVDF: Acrylic resin = 70:30 | Particle | Both sides | 0.6 |
| Example D21 | PE | 6 | Meta-type aramid | Mg(OH)₂ | 80 | Both sides | Present | 3.0 | PVDF: Acrylic resin = 50:50 | Particle | Both sides | 0.6 |
| Comparative Example D1 | PE | 6 | Meta-type aramid | Mg(OH)₂ | 80 | Both sides | Present | 3.0 | PVDF-HFP | Non-particle | Both sides | 0.6 |
| Comparative Example D2 | PE | 6 | Polyetherimide | Mg(OH)₂ | 80 | Both sides | Present | 3.0 | PVDF-HFP | Non-particle | Both sides | 0.6 |
| Comparative Example D3 | PE | 6 | Acrylic resin | Alumina | 85 | Both sides | Absent | 3.0 | PVDF-HFP | Non-particle | Both sides | 0.6 |
| Comparative Example D4 | PE | 6 | Acrylic resin | Alumina | 94.6 | Both sides | Absent | 3.0 | PVDF | Particle | Both sides | 0.6 |

TABLE 8

| | Separator | | | | | | | | Battery | |
|---|---|---|---|---|---|---|---|---|---|---|
| | Thickness [μm] | Basis weight [g/m²] | Gurley value [seconds/100 mL] | ΔGurley value [seconds/100 mL] | Tensile strength [kgf/cm²] MD direction | Tensile strength [kgf/cm²] TD direction | Heat shrinkage [%] | Peel strength between substrate and heat resistant layer [N/m] | Adhesive strength to electrode [index] | Production yield | Battery swelling |
| Example D1 | 11 | 6.8 | 150 | 50 | 1598 | 893 | 22 | 27 | 409 | A | A |
| Example D2 | 11 | 6.8 | 160 | 60 | 1734 | 918 | 23 | 27 | 934 | A | A |
| Example D3 | 11 | 6.8 | 148 | 48 | 1633 | 926 | 21 | 27 | 388 | A | A |
| Example D4 | 11 | 6.8 | 156 | 56 | 1612 | 909 | 22 | 26 | 378 | A | A |
| Example D5 | 9.5 | 5.3 | 120 | 20 | 1850 | 1034 | 30 | 43 | 370 | A | A |
| Example D6 | 12 | 7.8 | 165 | 65 | 1465 | 819 | 18 | 26 | 422 | A | A |
| Example D7 | 9 | 6.5 | 134 | 34 | 1953 | 1091 | 23 | 27 | 293 | C | B |
| Example D8 | 13 | 8.3 | 233 | 133 | 1352 | 756 | 22 | 27 | 1253 | A | A |
| Example D9 | 14 | 9.2 | 278 | 178 | 1256 | 702 | 22 | 27 | 1669 | A | A |
| Example D10 | 16 | 10.2 | 326 | 226 | 1099 | 614 | 22 | 27 | 2101 | A | A |
| Example D11 | 18 | 11.2 | 410 | 310 | 977 | 546 | 22 | 27 | 2156 | A | A |
| Example D12 | 10 | 6.2 | 180 | 80 | 1758 | 982 | 26 | 29 | 511 | A | A |
| Example D13 | 11 | 6.5 | 165 | 65 | 1609 | 903 | 25 | 28 | 441 | A | A |
| Example D14 | 12 | 7.0 | 140 | 40 | 1448 | 823 | 19 | 23 | 367 | A | A |
| Example D15 | 9 | 5.8 | 210 | 110 | 2002 | 1056 | 29 | 31 | 686 | A | A |
| Example D16 | 11 | 6.8 | 145 | 45 | 1741 | 915 | 21 | 39 | 483 | A | A |
| Example D17 | 11 | 6.8 | 153 | 53 | 1623 | 899 | 19 | 12 | 353 | A | A |
| Example D18 | 17 | 10.2 | 343 | 101 | 1589 | 132 | 21 | 28 | 409 | A | A |
| Example D19 | 10 | 6.9 | 174 | 74 | 1772 | 980 | 22 | 28 | 531 | A | A |
| Example D20 | 10 | 7.0 | 175 | 75 | 1790 | 971 | 22 | 27 | 688 | A | A |
| Example D21 | 10 | 6.6 | 171 | 71 | 1783 | 988 | 23 | 27 | 697 | A | A |
| Comparative Example D1 | 11 | 6.8 | 185 | 85 | 1670 | 828 | 22 | 27 | 100 | D | C |
| Comparative Example D2 | 11 | 6.8 | 171 | 71 | 1651 | 916 | 20 | 25 | 104 | C | C |
| Comparative Example D3 | 11 | 6.8 | 162 | 62 | 1598 | 875 | 19 | 12 | 135 | C | C |
| Comparative Example D4 | 11 | 6.8 | 114 | 14 | 1706 | 943 | 15 | 4 | 38 | D | C |

After a heat resistant porous layer was formed, a surface thereof was observed with a scanning electron microscope. In Examples D1 to D16 and D18 to D21, and Comparative Examples D1 and D2, a porous coating film was formed. In Examples D1 to D14, D16, and D18 to D21 and Comparative Examples D1 and D2, inorganic particles were bonded to each other and covered by the porous coating film. In Example D17 and Comparative Examples D3 and D4, inorganic particles were bonded to each other by a fibril-like resin, but a porous coating film was not formed.

The disclosure of Japanese Patent Application No. 2017-252241 filed on Dec. 27, 2017 is incorporated herein by reference in its entirety. The disclosure of Japanese Patent Application No. 2017-252242 filed on Dec. 27, 2017 is incorporated herein by reference in its entirety. The disclosure of Japanese Patent Application No. 2017-252243 filed on Dec. 27, 2017 is incorporated herein by reference in its entirety. The disclosure of Japanese Patent Application No. 2017-252244 filed on Dec. 27, 2017 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

REFERENCE SIGNS LIST 10A, 10B, 10C, 10D: Separator
20: Porous substrate
30: Heat resistant porous layer
40: Layered body
50: Adhesive layer
52: Adhesive resin particles

The invention claimed is:

1. A separator for a non-aqueous secondary battery, the separator comprising:
a porous substrate;
a heat resistant porous layer that is provided on one side or on both sides of the porous substrate, and that contains a porous coating film including at least one selected from the group consisting of a wholly aromatic polyamide, a polyamide imide and a polyimide; and
an adhesive layer that is provided on one side or on both sides of a layered body comprising the porous substrate and the heat resistant porous layer, wherein adhesive resin particles adhere to the layered body,
wherein the heat resistant porous layer includes:
an inner layer formed on the porous substrate and containing inorganic particles and at least one selected from the group consisting of a wholly aromatic polyamide, a polyamide imide, and a polyimide, wherein the at least one selected from the group consisting of a wholly aromatic polyamide, a polyamide imide and a polyimide in the inner layer is the same as the at least one selected from the group consisting of a wholly aromatic polyamide, a polyamide imide and a polyimide in the porous coating film; and
the porous coating film formed so as to cover an outer surface of the inner layer;
wherein the porous coating film is a resin portion forming an outer surface of the heat resistant porous layer and spreading like a film in which plural pores are formed in the resin portion, and
wherein the inner layer and the porous coating film satisfy the relationship: a porosity of inner layer>a porosity of porous coating film.

2. The separator for a non-aqueous secondary battery according to claim 1, wherein a peel strength between the porous substrate and the heat resistant porous layer is from 5 N/m to 75 N/m.

3. The separator for a non-aqueous secondary battery according to claim 1, wherein a content ratio of the inorganic particles in the heat resistant porous layer is from 50% by mass to 90% by mass.

4. The separator for a non-aqueous secondary battery according to claim 1, wherein the adhesive resin particles comprise a mixture that includes a first adhesive resin particle containing a polyvinylidene fluoride type resin and a second adhesive resin particle containing an acrylic type resin.

5. The separator for a non-aqueous secondary battery according to claim 1, wherein a Gurley value difference between the separator for a non-aqueous secondary battery and the porous substrate is from 20 sec/100 ml to 300 sec/100 ml.

6. The separator for a non-aqueous secondary battery according to claim 1, wherein at least one of a tensile strength of an MD direction, or a tensile strength of a TD direction, of the separator for a non-aqueous secondary battery is from 500 kgf/cm$^2$ to 3,000 kgf/cm$^2$.

7. The separator for a non-aqueous secondary battery according to claim 1, wherein a weight of the adhesive layer is from 0.2 g/m$^2$ to 2.0 g/m$^2$ per one side of the layered body.

8. The separator for a non-aqueous secondary battery according to claim 1, wherein the porous substrate is a microporous membrane containing a polypropylene.

9. The separator for a non-aqueous secondary battery according to claim 1, wherein the at least one selected from the group consisting of a wholly aromatic polyamide, a polyamide imide and a polyimide is at least one selected from the group consisting of a meta type wholly aromatic polyamide and a para type wholly aromatic polyamide.

10. A non-aqueous secondary battery that obtains electromotive force by lithium doping and dedoping, the non-aqueous secondary battery comprising:
a positive electrode;
a negative electrode; and
the separator for a non-aqueous secondary battery according to claim 1, the separator being disposed between the positive electrode and the negative electrode.

11. A separator for a non-aqueous secondary battery, the separator comprising:
a porous substrate;
a heat resistant porous layer that is provided on one side or on both sides of the porous substrate, and that contains at least one of inorganic particles or a heat resistant resin, the heat resistant resin having at least one of an amide bond or an imide bond in a molecule; and
an adhesive layer that is provided on one side or on both sides of a layered body comprising the porous substrate and the heat resistant porous layer, wherein adhesive resin particles adhere to the layered body,
wherein the heat resistant porous layer includes an inner layer formed on the porous substrate,
wherein the heat resistant resin constitutes a porous coating film to form a three-dimensional network structure, and the porous coating film is a resin portion that covers an outer surface of the inner layer, forming an outer surface of the heat resistant porous layer and spreading like a film in which plural pores are formed in the resin portion, wherein the inner layer and the porous coating film satisfy the relationship: a porosity of inner layer>a porosity of porous coating film, and wherein a peel strength between the porous substrate and the heat resistant porous layer is from 5 N/m to 75 N/m.

12. The separator for a non-aqueous secondary battery according to claim 11, wherein a Gurley value difference between the separator for a non-aqueous secondary battery and the porous substrate is from 20 sec/100 ml to 300 sec/100 ml.

13. The separator for a non-aqueous secondary battery according to claim 11, wherein at least one of a tensile strength of an MD direction, or a tensile strength of a TD direction, of the separator for a non-aqueous secondary battery is from 500 kgf/cm$^2$ to 3,000 kgf/cm$^2$.

14. The separator for a non-aqueous secondary battery according to claim 11, wherein a weight of the adhesive layer is from 0.2 g/m$^2$ to 2.0 g/m$^2$ per one side of the layered body.

15. The separator for a non-aqueous secondary battery according to claim 11, wherein the porous substrate is a microporous membrane containing a polypropylene.

16. The separator for a non-aqueous secondary battery according to claim 11, wherein the adhesive resin particles contain a mixture that includes:

a resin particle F containing a polyvinylidene fluoride type resin in an amount of more than 50% by mass with respect to a total solid content of the resin particle F; and a resin particle A containing an acrylic type resin in an amount of more than 50% by mass with respect to a total solid content of the resin particle A, wherein a mass ratio between the resin particle F and the resin particle A (resin particles F:resin particles A) in the mixture is from 50:50 to 90:10.

17. The separator for a non-aqueous secondary battery according to claim 11, wherein the adhesive resin particles are selected from the group consisting of polyvinylidene fluoride particles, particles of a copolymer of vinylidene fluoride and tetrafluoroethylene, particles of a copolymer of vinylidene fluoride and hexafluoropropylene, and particles of a copolymer of vinylidene fluoride and trifluoroethylene.

18. The separator for a non-aqueous secondary battery according to claim 11, wherein the heat resistant resin is at least one selected from the group consisting of a meta type wholly aromatic polyamide and a para type wholly aromatic polyamide.

19. A non-aqueous secondary battery that obtains electromotive force by lithium doping and dedoping, the non-aqueous secondary battery comprising:

a positive electrode;

a negative electrode; and the separator for a non-aqueous secondary battery according to claim 11, the separator being disposed between the positive electrode and the negative electrode.

* * * * *